(12) United States Patent
Bikson

(10) Patent No.: US 11,673,099 B2
(45) Date of Patent: Jun. 13, 2023

(54) COMPOSITE POLY (ARYL ETHER KETONE) MEMBRANES, THEIR PREPARATION AND USE THEREOF

(71) Applicant: Avanpore LLC, Newton, MA (US)

(72) Inventor: Benjamin Bikson, Newton, MA (US)

(73) Assignee: Avanpore LLC, Newton, MA (US)

( * ) Notice: Subject to any disclaimer, the term of this patent is extended or adjusted under 35 U.S.C. 154(b) by 0 days.

(21) Appl. No.: 17/737,211

(22) Filed: May 5, 2022

(65) Prior Publication Data

US 2023/0059166 A1   Feb. 23, 2023

Related U.S. Application Data

(60) Provisional application No. 63/221,656, filed on Jul. 14, 2021.

(51) Int. Cl.
*B01D 69/12* (2006.01)
*B01D 67/00* (2006.01)
(Continued)

(52) U.S. Cl.
CPC ....... *B01D 69/125* (2013.01); *B01D 67/0088* (2013.01); *B01D 69/105* (2013.01);
(Continued)

(58) Field of Classification Search
None
See application file for complete search history.

(56) References Cited

U.S. PATENT DOCUMENTS

| 4,721,732 A | 1/1988 | Dubrow et al. |
| 4,897,307 A | 1/1990 | Beck et al. |

(Continued)

FOREIGN PATENT DOCUMENTS

WO   WO2007051307   5/2007

OTHER PUBLICATIONS

Chen, G.; Chen, Y.; Huang, T.; He, Z.; Xu, J.; Liu, P. Pore Structure and Properties of PEEK Hollow Fiber Membranes: Influence of the Phase Structure Evolution of PEEK/PEI Composite. Polymers 2019, 11, 1398. https://doi.org/10.3390/polym11091398 (Year: 2019).*

(Continued)

*Primary Examiner* — Jason M Greene
*Assistant Examiner* — Eric J McCullough
(74) *Attorney, Agent, or Firm* — Forge IP, PLLC

(57) ABSTRACT

Disclosed is the preparation of composite membranes formed by a tailored selective chemical modification of an ultra-thin nanoporous surface layer of a semi-crystalline mesoporous poly (aryl ether ketone) membrane with graded density pore structure. The composite separation layer is synthesized in situ on the poly (aryl ether ketone) substrate surface and is covalently linked to the surface of the semi-crystalline mesoporous poly (aryl ether ketone) membrane. Hollow fiber configuration is the preferred embodiment of forming the functionalized the poly (aryl ether ketone) membranes. Composite poly (aryl ether ketone) membranes of the present invention are particularly useful for a broad range of fluid separation applications, including organic solvent ultrafiltration and nanofiltration to separate and recover active pharmaceutical ingredients.

30 Claims, 5 Drawing Sheets

(51) Int. Cl.
  *B01D 71/38* (2006.01)
  *B01D 69/10* (2006.01)
  *B01D 71/64* (2006.01)
(52) U.S. Cl.
  CPC ............. *B01D 71/38* (2013.01); *B01D 71/64* (2013.01); *B01D 2323/28* (2013.01); *B01D 2323/46* (2013.01); *B01D 2325/022* (2013.01)

(56) References Cited

U.S. PATENT DOCUMENTS

| | | | |
|---|---|---|---|
| 5,200,078 | A | 4/1993 | Beck et al. |
| 5,205,968 | A | 4/1993 | Damrow et al. |
| 5,227,101 | A | 7/1993 | Mahoney et al. |
| 6,017,455 | A | 1/2000 | Shimoda et al. |
| 6,887,408 | B2 | 5/2005 | Yuan |
| 7,022,798 | B2 | 4/2006 | King |
| 7,176,273 | B2 | 2/2007 | Yuan et al. |
| 7,229,580 | B2 | 6/2007 | Yuan |
| 7,368,526 | B2 | 5/2008 | Yuan et al. |
| 7,439,291 | B2 | 10/2008 | Wang et al. |
| 9,610,547 | B2 | 4/2017 | Ding et al. |
| 10,328,425 | B2 | 6/2019 | Haring |
| 10,376,846 | B2 | 8/2019 | Ding et al. |
| 2007/0129529 | A1* | 6/2007 | Yuan .................. B01J 20/28033 528/125 |
| 2013/0112619 | A1 | 5/2013 | Livingston et al. |
| 2013/0119313 | A1* | 5/2013 | Zhou .................. C09K 11/7774 65/30.13 |

OTHER PUBLICATIONS

Surface Reduction of Poly(aryl ether ether ketone) Film: UV Spectrophotometric, 3H Radiochemical, and X-ray Photoelectron Spectroscopic Assays of the Hydroxyl Functions, Olivier Noiset, Catherine Henneuse, Yves-Jacques Schneider, and Jacqueline Marchand-Brynaert, Macromolecules 1997 30 (3), 540-548 (Year: 1997).*
Tingjian Huang, et al., Pore structure and properties of poly(ether ether ketone) hollow fiber membranes: influence of solvent-induced crystallization during extraction, vol. 68, Issue 11, Nov. 2019, pp. 1874-1880 (Year: 2019).*
Bristow, J.F., et al., "Investigation of semicrystalline morphology in poly(ether ether ketone)/poly(ether imide) blends by dielectric relaxation spectroscopy"; Polymer vol. 38 No. 2, pp. 287-295, 1997.
Burgal J., et al., "Controlling molecular weight cut-off of PEEK nanofiltration membranes using a dryingmethod"; Journal of Membrane Science 493 (2015) 524-538.
Chen, Y., et al., "Preparation of antifouling poly (ether ether ketone) hollow fiber membrane by ultraviolet grafting of polyethylene glycol"; Materials Today Communications 27 (2021) 102326.
Chen, G., et al., "Pore Structure and Properties of PEEK Hollow Fiber Membranes: Influence of the Phase Structure Evolution of PEEK/PEI Composite"; Polymers 2019, 11, 1398; doi:10.3390/polym11091398.
Diez-Pascual, A.M., et al., "Synthesis and Characterization of Poly(ether ether ketone) Derivatives Obtained by Carbonyl Reduction"; Macromolecules, vol. 42, No. 18, 2009; pp. 6885-6892.
Ding, Y., et al., "Preparation and characterization of semi-crystalline poly(ether ether ketone) hollow fiber membranes"; Journal of Membrane Science 357 (2010) 192-198.
Ding, Y., et al., "Macro and meso porous polymeric materials from miscible polysulfone/polyimide blends by chemical decomposition of polyimides"; Polymer 51 (2010) 46-52.
Henneuse, C., et al., "Surface carboxylation of PEEK film by selective wet-chemistry"; Polymer vol. 39, No. 4, 1998, pp. 835-844.
Henneuse-Boxus, C., et al., "Surface functionalization of PEEK films using photochemical routes"; European Polymer Journal 37 (2001) 9-18.
Henneuse-Boxus, C., et al., "Surface amination of PEEK film by selective wet-chemistry"; Polymer vol. 39 No. 22, pp. 5359-5369, 1998.
Henneuse-Boxus, C., et al., "Covalent attachment of fluorescence probes on the PEEK-OH film surface"; Polymer 41 (2000) 2339-2348.
Huang, T., et al., "Pore structure and properties of poly(ether ether ketone) hollow fiber membranes: influence of solvent-induced crystallization during extraction"; PolymInt 2019; 68: 1874-1880.
Kalika, D.S., et al., "Dynamic Relaxation Behavior of Solvent-Crystallized Poly( ether ether ketone)"; Journal of Polymer Science: Part B Polymer Physics, vol. 32, 759-770 (1994).
Kalika, D.S., et al., "Relationship between Morphology and Glass Transition Temperature in Solvent-Crystallized Poly (aryl ether ketones)"; Journal of Polymer Science: Part B: Polymer Physics, vol. 36, 65-73 (1998).
Kyomoto, M., et al., "Self-Initiated Surface Graft Polymerization of 2-Methacryloyloxyethyl Phosphorylcholine on Poly (ether ether ketone) by Photoirradiation"; Applied Materials & Interfaces vol. 1, No. 3, 537-542, 2009.
Lovinger, A.J., et al., "Solution Crystallization of Poly(ether ether ketone)"; Macromolecules, vol. 19, No. 7, 1986, pp. 1861-1867.
Mehta, R.H., et al., "Microporous membranes based on poly(ether ether ketone) via thermally-induced phase separation"; Journal of Membrane Science 107 (1995) 93-106.
Mehta, R.H., et al., "Characteristics of Poly (ether ether ketone) Microporous Membranes Prepared via Thermally Induced Phase Separation (TIPS)"; Journal of Applied Polymer Science, vol. 66, 2347-2355 (1997).
Noiset, O., et al., "Surface Modification of Poly (aryl ether ether ketone) (PEEK) Film by Covalent Coupling of Amines and Amino Acids through a Spacer Arm"; Journal of Polymer Science: Part A: Polymer Chemistry, vol. 35, 3779-3790 (1997).
Noiset, O., et al., "Surface Reduction of Poly(aryl ether ether ketone) Film: UV Spectrophotometric, 3H Radiochemical, and X-ray Photoelectron Spectroscopic Assays of the Hydroxyl Functions"; Macromolecules 1997, 30, 540-548.

* cited by examiner

COMPOSITE POLY (ARYL ETHER KETONE) MEMBRANES, THEIR PREPARATION AND USE THEREOF

FIELD OF THE INVENTION

This invention relates to the preparation and use of composite polymeric membranes for a broad range of fluid separations, and more particularly, to the preparation of such composite polymeric membranes formed by chemical functionalization of a porous poly (aryl ether ketone) substrate.

BACKGROUND OF THE INVENTION

Porous polymeric membranes are well known in the art and are used widely for filtration and purification processes, such as filtration of waste water, desalination, preparation of ultra-pure water and in medical, pharmaceutical or food applications, including removal of microorganisms, dialysis and protein filtration. A membrane is generally defined as a selective barrier that permits passage of one or more components through the membrane while retaining one or more components. Porous polymeric membranes are used to separate components of liquid mixtures by filtration, membrane distillation and as contactors to facilitate dissolution of gases in liquids or to remove gases from liquids, as membrane bioreactors, and in numerous other applications where they serve as a generic phase separator, for example, as a battery separator. The application spectrum of membrane processes stretches from filtration of solids up to separations in a molecular range. Pressure driven membrane processes, such as microfiltration (MF), ultrafiltration (UF), nanofiltration (NF) and reverse osmosis (RO), are established large scale industrial processes for water purification and recovery of high value substances. Initially applied to water-based systems, membrane separations are increasingly applied to non-water solvent-based systems as well.

Composite polymeric membranes that consist of a selective separation layer superimposed on a porous support constitute an advanced class of fluid separation membranes. Composite membranes are used in water purification and desalination and in gas separation applications, such as natural gas treatment, gas dehydration, and hydrogen recovery from petrochemical and refinery streams. Most commonly used RO membranes are composite. The composite RO membrane consists of three layers: a polyester web, a microporous polysulfone interlayer support and an ultra-thin polyamide barrier layer on the top surface formed by an interfacial polymerization process. Composite membranes are further utilized for vapor permeation, removal of dissolved gases from liquids and for dehydration of liquids. While these membranes have found broad utility for a variety of purposes, they suffer from several disadvantages: a broad and non-uniform pore size distribution, and a limited chemical, solvent and thermal resistance. This limits membrane utility in applications that require molecular level separations, such as separation of active pharmaceutical ingredients, APIs. The synthesis of APIs is frequently carried out in aggressive solvent systems. Membranes capable of operation in aggressive chemical, solvent systems at high temperatures while performing molecular level separations are thus needed.

Today's thin-film composite RO and NF membranes are made from polyamides assembled on a porous support by interfacial polymerization. However, these membranes suffer from a low chemical stability, as the polyamides are not stable in the presence of hypochlorite, which is commonly used for disinfection and membrane cleaning. Furthermore, these membranes are mostly produced in a flat sheet geometry and packed into spiral-wound modules. Such modules cannot be cleaned by back washing, which is a desired strategy for membrane cleaning. The packing density of spiral wound modules is low as compared to hollow fiber membrane modules. Thus, there is a need for a composite membrane preparation methodology applicable to hollow fiber module configurations.

Membrane based fluid separations are pressure driven processes and conventionally classified by their ability to concentrate or purify molecules based on molecular weight. Thus, ultrafiltration membranes are conventionally defined as separating molecules in the range of $10^3$-$10^6$ Da dissolved in solvents, in particular proteins. A nanofiltration (NF) membrane is classified as a pressure-driven membrane process, falling between a reverse osmosis (RO) and ultrafiltration (UF) membrane. It has pore size in the range of 0.2-2 nm with molecular weight cut-off (MWCO) from 200 to 1000 Da. An organic solvent reverse osmosis process, OSRO, is defined as separating molecules below 200 Da dissolved in solvents.

Both pore size and functionality determine membrane separation efficiency. Membrane surface functionalization is a known method of tailoring membrane performance. The surface modification can be carried out by wet chemistry reactions, grafting, including photopolymerization, and energetic methods, like plasma treatment, among others.

Commercial porous membranes are fabricated almost exclusively by solution-based processes that limit their solvent and thermal resistance and thus limit the scope of their application. Preparation of nanoporous membranes from high temperature thermoplastics on a commercial scale by melt processing is virtually unknown. The poly (aryl ether ketones) are polymeric materials with exceptional thermo-mechanical properties and chemical/solvent resistance. It is an object of the instant invention to develop a commercially scalable method of forming porous membranes with nanometer size pores from poly (aryl ether ketone) polymers and apply these membranes for fluid separation processes.

Preparation of porous membranes from poly (aryl ether ketones) has been limited to the family member poly (ether ether ketone), PEEK. A number of methods to prepare porous PEEK membranes have been disclosed in the art. It is known to prepare porous PEEK membranes from solutions of strong acids, such as concentrated sulfuric acid. However, PEEK can undergo sulfonation in the concentrated sulfuric acid media and thus can lose some of its desirable sought after properties. U.S. Pat. No. 6,017,455 discloses preparation of non-sulfonated porous PEEK membranes from concentrated sulfuric acid solvents sufficiently diluted by water to prevent sulfonation. The membranes are formed by casting PEEK solution to form a film followed by coagulation in a concentrated sulfuric acid. This membrane preparation process is complicated and produces large amounts of waste acid.

U.S. Pat. No. 5,997,741 discloses preparation of porous PEEK membranes by forming a solution of PEEK polymer in a concentrated sulfuric acid at the temperature of 15° C. or lower to prevent sulfonation. The solution is processed and cast at a sub ambient temperature, followed by coagulation in water or in a concentrated sulfuric acid. Only dilute PEEK solutions can be formed in the concentrated sulfuric acid, which adversely affects film forming characteristics, the mechanical characteristics, and the pore morphology of the thus formed porous PEEK membranes.

U.S. Pat. Nos. 4,992,485 and 5,089,192 disclose preparation of porous PEEK membranes from non-sulfonating acid solvents, which include methane sulfonic acid and trifluoromethane sulfonic acid. European Patent Specification EP 0737506 A1 discloses preparation of improved polymeric membranes based on PEEK admixtures with polyethylene terephthalate. The membranes are formed by the solution casting process from a methane sulfuric acid/sulfuric acid solvent mixture.

The acid based solvent systems for manufacture of porous PEEK membranes disclosed in the art are highly corrosive, frequently toxic and generate substantial environmental and disposal problems. For these and other reasons, the acid based casting processes have found limited commercial use.

An alternative to the acid based solvent system for PEEK membrane preparation involves the use of high boiling point solvents and plasticizers that dissolve PEEK polymer at elevated temperatures. U.S. Pat. Nos. 4,957,817 and 5,064,580, both issued to Dow Chemical Co., disclose preparation of porous PEEK articles from its admixture with organic polar solvents having a boiling point in the range of 191° C. to 380° C., such as benzophenone and 1-chloronaphthalene, and organic plasticizers capable of dissolving at least 10 weight percent of PEEK, respectively. The final porous article is formed by removing the organic polar solvents and/or plasticizers by dissolution into a low boiling temperature solvent. U.S. Pat. No. 5,200,078 discloses preparation of microporous PEEK membranes from its mixtures with plasticizers wherein the membrane undergoes a drawing step prior to or after the plasticizer is removed by leaching. U.S. Pat. No. 5,227,101 issued to Dow Chemical Co. discloses preparation of microporous membranes from poly(aryl ether ketone) type polymer by forming a mixture of PEEK type polymer, a low melting point crystallizable polymer, and a plasticizer, heating the resulting mixture, extruding or casting the mixture into a membrane, quenching or coagulating the membrane and leaching the pore forming components. U.S. Pat. No. 5,205,968, issued to Dow Chemical Co., discloses preparation of microporous membranes from a blend containing a poly (aryl ether ketone) type polymer, an amorphous polymer and a solvent.

M. F. Sonnenschein, in the article entitled "Hollow fiber microfiltration membranes from poly (ether ether ketone)", published in the Journal of Applied Polymer Science, Volume 72, pages 175-181, 1999, describes preparation of PEEK hollow fiber membranes by a thermal phase inversion process. The use of a leachable additive polymer, such as polysulfone, is proposed to enhance membrane performance. Preparation of porous PEEK membranes by coextrusion of PEEK with polysulfone polymers followed by the dissolution of the polysulfone polymer from the interpenetrating network is disclosed in European Patent Application EP 0409416 A2.

It is also known in the art to prepare porous PEEK membranes from its blends with a compatible poly (ether imide) polymer, PEI. Preparation of such membranes is described by R. S. Dubrow and M. F. Froix in U.S. Pat. No. 4,721,732 and by R. H. Mehta et al. in an article entitled "Microporous membranes based on poly (ether ether ketone) via thermally induced phase separation", published in the Journal of Membrane Science, Volume 107, pages 93-106, 1995. The porous structure of these PEEK membranes is formed by leaching the poly (ether imide) component with an appropriate strong solvent such as dimethylformamide. However, as described by Mehta et al., the quantitative removal of PEI component by leaching is essentially impossible which in turn can lead to an inferior porous structure.

Japan Kokai Tokkyo Koho 91273038 assigned to Sumitomo Electric Industries, Ltd., discloses preparation of porous PEEK membranes by an ion track etching method.

M. L. Bailey et al., in U.S. Pat. No. 5,651,931, describe a sintering process for the preparation of biocompatible filters, including PEEK filters. The filters are formed from a PEEK powder of a pre-selected average particle size by first pressing the powder into a "cake" followed by sintering in an oven or furnace. The process is limited to preparation of filters with a relatively large pore size and a broad pore size distribution and does not provide economic means of forming large membrane area fluid separation devices.

A process for preparation of porous PAEK articles that preserves the desirable thermal and chemical characteristics of PAEK polymers has been disclosed in U.S. Pat. No. 6,887,408. The porous articles are prepared from PAEK blends with compatible polyimides. An article of targeted shape is formed from the PAEK/polyimide blend by melt processing followed by removal of the polyimide phase by reaction with a primary amine. The method enables preparation of shaped porous PEEK articles, including hollow fibers membranes. Preparation of such hollow fiber membranes is described by Yong Ding and Ben Bikson in article entitled "Preparation and characterization of semi-crystalline poly (ether ether ketone) hollow fiber membranes", published in the Journal of Membrane Science, volume 357 (2010), p. 192-198. Preparation of hollow fiber membranes by this methodology is further described by Gong Chen, Yuan Chen, Tingjian Huang, Zhongchen He, Jianjun Xu and Pengqing Liu, in the article entitled "Pore Structure and Properties of PEEK Hollow Fiber Membranes: Influence of the Phase Structure Evolution of PEEK/PEI Composite", Polymers, Volume 11 (2019), p. 1398.

D. Morrisette and P. Croteu, in PCT application, International Publication Number WO2007/051309, disclose porous PEEK material suitable for medical implant devices. The porous material is formed by mixing dissolvable material with PEEK in a molten form and subsequently removing the dissolvable material. The disclosed dissolvable material is a salt. The method capable of forming PEEK materials with very large pore size and irregular pore structure.

M. C. Iliuta et al., in U.S. Pat. No. 9,908,985, disclose preparation of microporous hydrophobic polymeric hollow fibers. The hollow fibers are prepared by melt processing from mixture of polymer with micron size NaCl particles followed by salt dissolution. The hollow fiber is reported to be non-wetting and useful for gas transfer contacting applications.

Poly (aryl ether ketones) are high performance engineering polymers that exhibit exceptional thermal and chemical characteristics and are thus highly sought after as porous substrates for applications that require solvent and thermal resistance. However, the properties that make PAEK polymers desirable also make preparation of porous media difficult. In contrast, the chemical resistance of PAEK polymers enables chemical modification of preformed polymer surfaces without alteration of the underlying structure.

Surface functionalization of PEEK articles is of great interest. The work to date has largely been limited to surface functionalization of solid PEEK articles. The poly (aryl ether) backbone structure of PEEK provides for unique methodologies of surface functionalization via ketone group modification using wet chemistry methodologies. The most frequently utilized method of PEEK functionalization is via reduction of surface ketone groups to form hydroxyl group functionalized surfaces. The preparation of —OH group functionalized dense PEEK materials is described by O. Noiset et al., in *Macromolecules*, 30, (1997), 540; and by 0. Noiset, et al. in *J. Biomat. Sci., Polymer Ed.*, 11, (2000), 767-786, DOI: 10.1163/156856200744002. The preparation of —OH group functionalized dense PEEK materials is further described by A. Diez-Pascual, et al., in *Macromolecules.*, 62, (2009), 6885. The surfaces of dense PEEK materials have been further functionalized with amino groups, carboxyl groups and amino acid groups among others. These functionalization methodologies are described in the following publications: O. Noiset, et al. *Polym. Sci.: Part A: Polym. Chem.*, 35, (1997) 3779-3790; C. Henneuse-Boxus, E. Duliere and J. Marchand-Brynaert, *Europ. Polym. J.*, 37 (2001) 9-18; C. Henneuse-Boxus, et al. Polym., 39 (1998) 835-844; C. Henneuse-Boxus, et al. *Polymer,* 39 (1998) 5359-5369.

Surface functionalization of porous PEEK membranes to impart hydrophobic characteristics is described in U.S. Pat. Nos. 9,610,547 and 10,376,846 entitled "Composite perfluorocarbon membranes, their preparation and use". The porous PEEK is first functionalized with hydroxyl groups that are further reacted with functional hydrophobic molecules. Functionalization of porous poly (aryl ether ketone) articles by reacting ketone groups in the backbone of poly (aryl ether ketone) polymer with a primary amine reagent are disclosed in U.S. Pat. Nos. 7,176,273 and 7,368,526.

In view of these, and other, advantageous properties associated with PAEK polymers, and to build on the previously known uses of such polymers, it would be desirable to provide a commercially feasible method for preparing composite polymeric membranes formed by chemical functionalization of a porous poly (aryl ether ketone) substrate, along with systems and methods employing such composite polymeric membranes for a broad range of fluid separations.

SUMMARY OF THE INVENTION

Disclosed is the preparation of composite poly (aryl ether ketone), PAEK, membranes and their use for a broad range of fluid separation applications. The composite membrane consists of an ultra-thin nanoporous separation layer supported by a porous PAEK substrate containing larger size pores. The separation layer can further contain target functional groups covalently attached to the asymmetric PAEK substrate. In this regard, the present invention takes advantage of the surprising discovery that composite poly (aryl ether ketone) membranes with an ultra-thin separation layer containing nanometer size pores can be formed utilizing porous poly (aryl ether ketone) substrates containing an asymmetric pore structure (smaller size surface pores and larger diameter interior size pores). The nanoporous separation layer can be further modified with target functional groups without affecting pre-formed interior porous structure. Such composite PAEK membranes are used for a broad range of fluid separation processes.

The nanoporous membranes of this invention are comprised of a poly (aryl ether ketone) or a blend of poly (aryl ether ketone)s. The preferred poly (aryl ether ketone)s are poly (ether ether ketone), PEEK, poly (ether ketone), PEK, poly (ether ketone ketone), PEKK, and poly (ether ketone ether ketone ketone), PEKEKK, as well as their copolymers. The poly (aryl ether ketone)s are manufactured by Victrex Corporation under the trade names Victrex® PEEK, Victrex® PEEK HT, and Victrex® PEEK ST. Poly (ether ether ketone) is further available from Solvay under trade name KetaSpire™ and another poly (aryl ether ketone) is available from Solvay under the trade name AvaSpire®. Poly (ether ether ketone) is further available from Evonik under the trade name VESTAKEEP®.

In one embodiment of the instant invention, an asymmetric surface functionalized poly (aryl ether ketone) fluid separation membrane is formed by a multi-step process: (a) a solid (non-porous) precursor article of a desired shape is formed from a poly (aryl ether ketone) polymer blend with a pore forming material, (b) benzophenone segments of poly (aryl ether ketone) polymer on only the surface of the precursor shaped article are modified with functional groups, and (c) the solid poly (aryl ether ketone) precursor article is converted into a nanoporous membrane by removing the pore forming material. Preferred functional groups are selected from primary, secondary, tertiary or quaternary amine groups, carboxyl group, sulfonic acid group, phosphate group, primary, secondary or tertiary hydroxyl groups and/or sulfhydryl group. In some embodiments, the shaped article undergoes crystallization via sequence of solvent and thermal treatments following step (a). The treatment leads to formation of PAEK substrate with an asymmetric pore structure. Alternatively, the article undergoes crystallization after surface modification step (b). The preferred article shape is the hollow fiber configuration and the preferred pore forming material is polyetherimide.

In another embodiment of the instant invention, the asymmetric surface functionalized poly (aryl ether ketone) fluid separation membrane is formed by a multi-step process: (a) a solid (non-porous) precursor article of a desired shape is formed from a poly (aryl ether ketone) polymer blend with a pore forming material, (b) the surface of the solid poly (aryl ether ketone) precursor article is converted into a thin nanoporous layer by removing the pore forming material from the surface of the article to a predetermined depth, (c) the thus formed mesoporous layer is modified with functional groups via chemical modification of benzophenone segments of poly (aryl ether ketone) polymer, and (d) the solid poly (aryl ether ketone) precursor article is converted into a nanoporous composite membrane by removing the remaining pore forming material. In some embodiments of the invention, steps (b) and (c) take place simultaneously. It is within the scope of the invention to crystallize the article via sequence of solvent and thermal treatments following step (a). The preferred article shape is the hollow fiber configuration and the preferred pore forming material is polyetherimide. Preferred functional groups are selected from primary, secondary, tertiary or quaternary amine groups, carboxyl group, sulfonic acid group, phosphate group, primary, secondary or tertiary hydroxyl groups, ethylene oxide groups and/or sulfhydryl group.

In another embodiment of the instant invention, the asymmetric surface functionalized poly (aryl ether ketone) fluid separation membrane is formed by a multi-step process: (a) a solid (non-porous) precursor article of a desired shape is formed from a poly (aryl ether ketone) polymer blend with a pore forming material, (b) the article is subjected to a treatment step wherein poly (aryl ether ketone) polymer undergoes crystallization, (c) the solid poly (aryl ether ketone) precursor article is converted into a nanoporous substrate by removing the pore forming material, (d) the nanoporous membrane is formed by modifying the substrate with functional groups. Preferably, the crystallization of the poly (aryl ether ketone) polymer in the blend during step (b) is carried out via sequence of solvent and thermal treatments. The treatment leads to formation of PAEK substrate with an asymmetric pore structure. The preferred article shape is the hollow fiber configuration and the preferred pore forming material is polyetherimide. Preferred functional groups are selected from primary, secondary, tertiary or quaternary amine groups, carboxyl group, sulfonic acid group, phosphate group, primary, secondary or tertiary hydroxyl groups, ethylene oxide and/or sulfhydryl group.

In one example, a mesoporous precursor article is prepared from a blend of PAEK polymer with a pore forming material (porogen). A precursor non-porous article is prepared from the PAEK/porogen blend by melt processing and is initially amorphous. The precursor amorphous article undergoes crystallization by subjecting the article to a solvent treatment step. The solvent and the treatment conditions are selected to affect crystallization of PAEK polymer phase in the article. The crystallization by the solvent treatment can be limited to the surface region of the article only. The solvent treatment step can be further followed by a thermal annealing step to affect crystallization of the interior. This sequential crystallization process leads to formation of the asymmetric pore structure in the PAEK substrate following porogen removal. The porogen acts as a pore forming material and is removed following the crystallization step to provide the initial asymmetric porous PAEK substrate article. The porous surface of the article is modified by functional groups to form the fluid separation membrane. In some embodiments, the surface functionalization is carried out following the thermal annealing step and prior to the porogen removal step. In some embodiments, the surface functional groups are further reacted with extender groups to modify pore size and membrane surface characteristics.

In one preferred embodiment, the surface functional groups are formed by a wet-chemical surface modification of the pre-formed shaped PAEK article that serves as a substrate. The PAEK substrate surface is modified with amino, carboxyl, acid chloride, aldehyde, isocyanate, sulfhydryl or hydroxyl functional groups that are particularly preferred. It is within the scope of the invention to covalently attach extender groups to the surface functional groups to further affect pore size and functionality. In this step, the functionalized porous PAEK substrate is reacted with a functional monomer that forms a brush extender group. The brush extender molecules modify the surface pore size to affect the separation efficiency. Brush extenders include low molecular weight hydrocarbons, oligomers or polymers containing functional groups, such as epoxy group or primary amino-groups $-NH_2$, wherein one set of functional groups is used to attach the brush to the functionalized poly (aryl ether ketone) surface. The attachment of the first targeted multi-functional extender group molecules can be followed by reacting the thus formed layer with an additional set of brush extender molecules to further affect pore size.

The PAEK precursor substrate used to form the composite membrane of this invention preferably exhibits a nanoporous surface pore structure with a narrow pore size distribution and an average surface pore size between 5 and 100 nanometers, preferably between 10 and 30 nm, and the interior pore size that is larger than the surface pore size by a factor of two or more. The substrate is pre-shaped as a film, a hollow fiber, a frit or a monolith. In some embodiments, the interior porous structure of the membrane exhibits a bimodal pore size distribution. The bimodal distribution consists of a mesoporous pore fraction with an average pore size below 50 nanometer and a macro-porous pore fraction with an average pore size above 0.5 micron.

In some embodiments, the fluid separation membrane is prepared by a method comprising: (a) forming a blend of poly(aryl ether ketone) polymer with a polyimide; (b) forming a shaped article from the blend by extrusion, casting or molding; (c) annealing the shaped article; (d) forming a porous structure throughout the shaped article, while simultaneously functionalizing the surface of the shaped article by bringing the article into contact with a primary amine to simultaneously decomposing the polyimide in the shaped article into low molecular weight fragments and functionalizing its surface, and (e) removing the low molecular weight fragments from the article.

In another example, the fluid separation membrane is prepared by a method comprising: (a) forming a blend of poly(aryl ether ketone) type polymer with a polyimide; (b) forming a shaped article from the blend by extrusion, casting, or molding; (c) crystallizing a fraction of poly(aryl ether ketone) polymer in the shaped article; (d) bringing the shaped article into contact with a primary amine to affect decomposition of the polyimide in the shaped article into low molecular weight fragments under conditions that do not cause functionalization of the poly(aryl ether ketone) polymer with the primary amine; (e) removing the low molecular weight fragments from the article; and (f) drying the porous poly (aryl ether ketone) article. The precursor amorphous article undergoes crystallization by subjecting the article to a solvent treatment step first followed by a thermal treatment. The solvent and the treatment conditions are selected to affect crystallization of PAEK polymer phase in the article in sequential steps. The crystallization by the solvent treatment is limited to the surface region of the article only. The solvent treatment step is further followed by a thermal annealing step to affect crystallization of the interior. This sequential crystallization process leads to formation of the asymmetric pore structure in the PAEK substrate following polyimide phase removal. The porous PAEK substrate formed by the above-described process is functionalized in a subsequent step with target surface groups. The thus formed membrane is incorporated into a fluid separation device. In some embodiments, the functionalization step is carried out in-situ in the fluid separation device.

The composite membranes of this invention separate components of fluid mixtures by selective permeation. The fluid mixture may contain multiple dissolved components. The fluid mixture is separated into a fraction enriched in at least one dissolved component and a fraction depleted in this dissolved component by permeation through composite membrane. The separation process is carried out by bringing the fluid mixture into contact with the composite fluid separation membrane while a pressure difference is maintained across the membrane, or in the case of a vapor component, a partial pressure difference is maintained across the membrane. The membrane separation layer formed on the surface of a poly (aryl ether ketone) membrane is in direct contact with the feed fluid mixture. A fraction enriched in the dissolved component and a fraction depleted in the dissolved component are generated by preferentially permeating a portion of the fluid mixture through the composite fluid separation membrane.

The fluid separation membranes of the present invention are particularly useful for separation of components dissolved or suspended in organic solvent media. PAEK membranes are solvent resistant and can be used to treat a broad range of solution of organic solvents including aromatic, heterocyclic and aliphatic hydrocarbons, ketones, aprotic solvents, alcohols and chlorinated solvents. The pore size and functionality of the separation layer is tailored to a specific separation application. The separation of dissolved molecules with molecular weight above 1000 Da is referred to as organic solvent ultrafiltration, OSUF, separation of molecules with molecular weight in the 200-1000 Da range is referred to as organic solvent nanofiltration, OSNF, and separation of molecules with molecular weight below 200 Dalton is referred to as an organic solvent reverse osmosis, OSRO, process.

The method of the invention provides for separation of a fluid mixture into a fraction enriched in at least one dissolved component and a fraction depleted in this dissolved component by bringing the fluid mixture in contact with a composite poly (aryl ether ketone) membrane whereby a fraction enriched in the dissolved component and a fraction depleted in the dissolved component are generated by preferentially permeating a portion of organic fluid mixture through the fluid separation membrane The fluid mixture is brought in contact with PAEK based fluid separation membrane while maintaining a pressure difference, or in case of a vapor component a partial pressure difference, across the membrane. The PAEK membrane has a separation layer formed on the surface of the PAEK membrane via chemical modification of benzophenone segments of the polymeric backbone.

The composite PAEK membranes of this invention can address a broad range of well-established fluid separations, including ultrafiltration (UF), nanofiltration (NF) and reverse osmosis (RO) processes. Emerging applications, such as organic solvent nanofiltration and the separation and recovery of active pharmaceutical ingredients, can be further efficiently addressed by membranes of this invention.

The above and other features of the invention, including various novel details of construction and combinations of parts, and other advantages, will now be more particularly described and pointed out in the appended claims. It will be understood that the particular methods and devices embodying the invention are shown by way of illustration and not as a limitation of the invention. The principles and features of this invention may be employed in various and numerous embodiments without departing from the scope of the invention.

BRIEF DESCRIPTION OF THE DRAWINGS

FIG. 4A shows a UV-VIS spectra of model compound-bis(4-(4-methoxyphenoxy)phenyl)methanol, BMPPM in sulfuric acid, while

DETAILED DESCRIPTION OF THE PREFERRED EMBODIMENTS

Figure 1A:
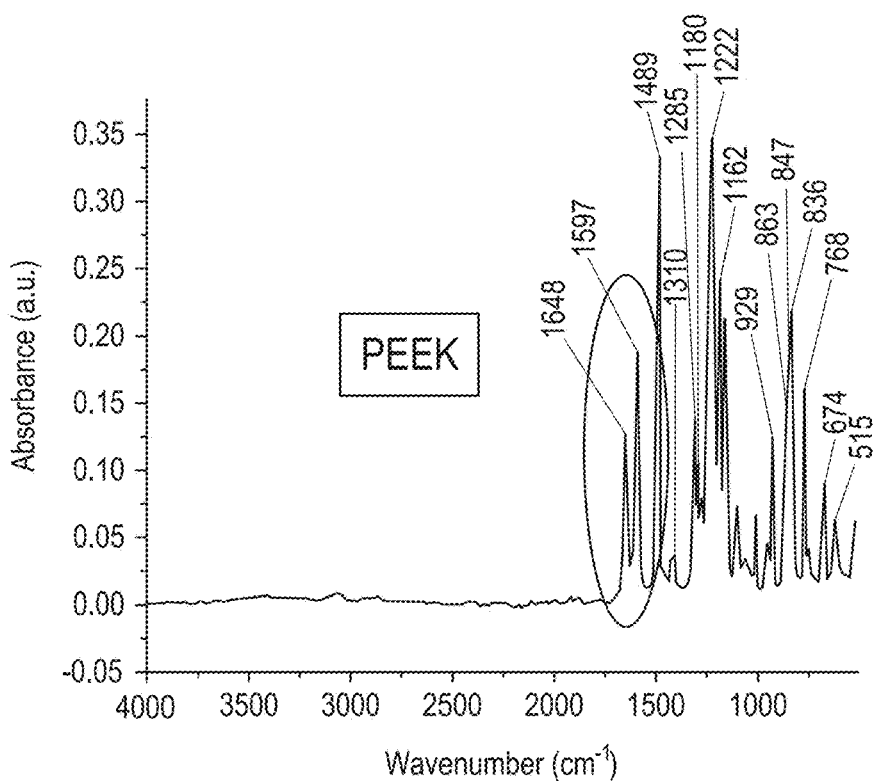
FIGS. 1A and 1B show, respectively, AT-FTIR spectra of an original PEEK hollow fiber and a PEEK-OH hollow fiber reduced with $NaBH_4$ for 3 hours.

Disclosed is a method for conducting fluid separations using composite poly (aryl ether ketone), PAEK, membranes. Also disclosed is the preparation of composite nanoporous PAEK hollow fiber membranes with tailored ultra-thin functionalized surface layers and their use for fluid separation processes. More particularly, the teachings of the present invention are directed to the preparation of solvent resistant nanoporous composite PAEK hollow fiber membranes with an asymmetric wall pore structure and functionalized separation layer and their use for ultra-filtration, nanofiltration and reverse osmosis processes.

Separation processes of the instant invention are characterized by the use of a composite porous PAEK membrane with an ultra-thin functionalized surface separation layer. The porous membrane can be in the form of a flat sheet, frit, monolith or hollow fiber. In the preferred embodiment, the porous PAEK membrane is a nanoporous hollow fiber membrane. A method of the instant invention separates a fluid mixture into a fraction enriched in a least one dissolved component and a fraction depleted in the dissolved component by contacting the fluid mixture with a first side of the fluid separation membrane while maintaining a pressure difference, or in case of a vapor component a partial pressure difference, across the membrane, whereby a fraction enriched in the dissolved component and a fraction depleted in the dissolved component are generated by preferentially permeating a portion of the fluid mixture through the fluid separation membrane, and whereby the fraction depleted in the dissolved component is collected as a permeate from the second side of the membrane. The porous membrane is formed from a poly (aryl ether ketone) polymer with the membrane separation layer formed by chemical modification of ketone groups in the benzophenone segments of the polymeric backbone. In some embodiments the pore surface across the entire cross section of the asymmetric membrane is functionalized by chemical modification of ketone groups in the benzophenone polymer backbone.

Membranes used in fluid separation processes of this invention are composite poly (aryl ether ketone), PAEK, membranes. The surface of PAEK substrate used in composite membrane preparation exhibits a uniform, narrow pore size distribution. The pore size is substantially within the mesoporous size range. A mesoporous material is a material containing pores with diameters between 2 and 50 nm, according to the International Union of Pure and Applied Chemistry, IUPAC, nomenclature. For comparison, IUPAC defines microporous material as a material having pores smaller than 2 nm in diameter and macroporous material as a material having pores larger than 50 nm in diameter. The porous PAEK substrates used for preparation of composite membranes exhibit an average pore diameter between 5 and 100 nm which is defined herein as being substantially mesoporous or nanoporous. In some embodiments of this invention, the porous structure of the PAEK substrate is composed of structural segments that differ in pore size; this includes porous substrates composed of two or more layers of different pore sizes. The layers can contain mesopores that differ in pore size. The substrate's interior can be composed of mesoporous and macroporous layers or exhibit a bimodal pore distribution that contain mesopores and macropores. Preferably, the average interior pore diameter of the membrane is larger than the average diameter of surface pores by a factor of two or more.

The nanoporous membranes used in the methods of the present invention are formed from poly (aryl ether ketone), PAEK, polymers. The porous poly (aryl ether ketone) polymers are defined as polymers containing at least one repeat aryl ether ketone segment in the polymeric backbone. A number of poly (aryl ether ketone) polymers are available commercially including poly (ether ketone), poly (ether ether ketone), poly (ether ketone ketone), poly (ether ether ketone ketone), poly (ether ketone ether ketone ketone) and copolymers collectively referred herein as poly (aryl ether ketones). Poly (aryl ether ketones) have an average molecular weight in the range of 20,000 to 1,000,000 Daltons, typically between 30,000 to 500,000 Daltons. Preferred poly (aryl ether ketones) used to form porous PAEK membranes of this invention are semi-crystalline, and are insoluble in common organic solvents at room temperature. Most preferred poly (aryl ether ketones) used to form porous PAEK articles of this invention are poly (ether ether ketone), PEEK, poly (ether ketone), PEK, poly (ether ketone ketone), PEKK, poly (ether ether ketone ketone), PEEKK, and poly (ether ketone ether ketone ketone), PEKEKK. A number of poly (aryl ether ketones) are manufactured by Victrex Corporation under the trade names Victrex® PEEK, Victrex® PEEK HT, and Victrex® PEEK ST. Poly (ether ether ketone) is further available from Solvay under trade name KetaSpire™ and another poly (aryl ether ketone) is available from Solvay under the trade name AvaSpire®. Poly (ether ether ketone) is further available from Evonik Corporation under the trade name VESTAKEEP®.

The PAEK substrate used in preparation of composite fluid separation membranes of this invention can be in a flat sheet configuration, in the form of a monolith, frit or in a hollow fiber (micro capillary) configuration wherein membrane configurations exhibit a nanoporous pore surface structure with a narrow pore size distribution and an average surface pore size between 5 and 100 nanometers. The membrane is preferably shaped as a hollow fiber. In some embodiments, the membrane wall structure exhibits a bimodal pore size distribution. The bimodal distribution consists of a mesoporous pore fraction with an average pore size below 100 nanometer and a macro-porous pore fraction with an average pore size above 0.5 micron. It is particularly preferred to utilize porous PAEK hollow fibers for fluid separation applications with asymmetric or multi-layer pore wall morphology. Hollow fibers with graded pore structure composed of a thin mesoporous surface layer and macro-porous bulk wall structure exhibit higher solute mass transfer rates while maintaining good stability. Hollow fibers with the layered graded pore structure are formed by coextrusion processes from membrane forming compositions with different contents of pore forming materials. At least one layer of multilayer structure is asymmetric with substantially smaller size surface pores as compared to interior pore size. The porous surface of asymmetric and multilayer PAEK hollow fibers is functionalized via chemical modification of ketone group in benzophenone segments of the polymeric backbone. In the preferred embodiment the exterior ultra-thin layer only is functionalized via chemical modification of benzophenone segments of the polymeric backbone to form a composite PAEK membrane.

The preferred method of forming the functionalized PAEK membrane is by first forming the PAEK substrate. The PAEK substrate is preferably formed by melt processing. The preparation of the porous poly (aryl ether ketone) substrate typically consists of the following steps: (1) Forming a blend of poly (aryl ether ketone) polymer with a pore forming material (porogen) by melt blending. The porogen is alternatively a diluent (a high boiling, low molecular weight liquid or solid), an intermediate molecular weight oligomer, a polymer or a mixture thereof; (2) Forming a shaped article from the blend by melt processing, such as extrusion, injection molding, casting, or molding; (3) Solidifying the shaped article by cooling; (4) Treating the article to affect crystallization of the PAEK polymer component; (5) Removing the porogen (the porogen is typically removed by extraction or reactive extraction); and (6) Drying the porous PAEK substrate.

The crystallization rate of poly (aryl ether ketones) is relatively slow. The crystallization rate of PAEK blends, in particular the PAEK/polyimide blends, can be further retarded. At high melt processing conditions such as extrusion the precursor shaped article is cooled down rapidly. These processing conditions retard crystallization and lead to the formation of a substantially amorphous article. The article formed under the rapidly cooling conditions may be thus substantially amorphous. Substantially amorphous article/substrate is defined as a PAEK article that did not attain a high optimal degree of crystallinity. For fully crystallized solid PAEK polymers, the degree of crystallinity can reach up to 40%, with 35% representing an average degree of crystallinity. Substantially amorphous PAEK/blend articles formed by melt processing exhibit a degree of crystallinity below 20%. In preferred embodiments the PAEK/blend articles exhibit a degree of crystallinity below 5%. The low initial degree of crystallinity enables development of the desired semi-crystalline morphology via the subsequent crystallization steps that may include a sequence of solvent induced crystallization followed by a thermally induced crystallization.

Prior to or subsequent to porogen removal from the substrate, the substrate can be treated to increase the degree of crystallinity of the PAEK phase by a thermal process or via solvent induced crystallization. Both methods are known in the art. The term annealing as defined herein refers to a processing step or condition that leads to an increase in the degree of crystallinity of the PAEK phase. The annealing can take place during the solidification step through the control of cooling rate. For example, the annealing can be carried out in line during the extrusion step by controlling the cooling rate. Alternatively, or in an addition, the annealing can be carried out in a subsequent step after an amorphous article has been formed by rapid solidification. In the latter case the solidified article can be placed in an oven or transported through a heating zone for a period of time sufficient to affect crystallization. The article can be annealed prior to the removal of the porogen to increase the degree of crystallinity of the PAEK phase at a temperature from about 150° C. to about 330° C., preferably from about 200° C. to about 310° C., most preferably from 250° C. to about 310° C.

Solvent induced crystallization can be carried out utilizing solvents that affect PAEK polymer crystallization. The solvent treatment can be carried out in an alcohol, a ketone, a chlorinated hydrocarbon, polyethylene glycol, an aromatic hydrocarbon or a mixture thereof. The solvent temperature can greatly affect the rate of crystallization. The combination of treatment temperature and the duration of the treatment can be used to control the depth of solvent induced crystallization treatment. The alcohols are selected from butanol, ethylene glycol, propylene glycol, isobutyl alcohol, tert-amyl alcohol, cetyl alcohol, pentanol, cyclohexanol or glycerol.

The ketones are particularly preferred and selected from acetone, methyl ethyl ketone (butanone), 2-hexanone, isophorone, methyl isobutyl ketone, cyclopentanone, acetophenone, valerophenone or pentanone. The solvent treatment can be carried out at an elevated temperature, but preferably below the boiling point of the solvent.

The annealing can take the form of a combination of solvent treatment steps followed by the thermal crystallization step. The crystallization protocol affects the crystalline morphology and crystal size that, in turn, affects pore structure. The pore volume is controlled by PAEK/porogen weight ratio in the blend and can range from 20/80 to 60/40, but preferably the ratio can range between 35/65 and 50/50.

Pore forming additives (porogens) can include high boiling solvents, compatible oligomers, nanoparticles or compatible or semi-compatible polymers. The use of compatible polymers or their mixtures with partially compatible polymers or nanoparticles as porogens is generally preferred. Preferred polymeric porogens include polysulfones, such as poly (ether sulfone), poly (ether ether sulfone), biphenol based polysulfones and bisphenol A based polysulfone, polycaprolactone, polyimides or mixtures thereof. The nanoparticles are soluble organic or inorganic materials. Inorganic nanoparticles, such as sodium chloride and sodium carbonate, are preferred. The most preferred polymeric porogens are aromatic polyimides. Poly (aryl ether ketone) type polymers form compatible blends with certain aromatic polyimides, PIs. Removal of the polyimide component from such blend articles by solvent extraction, however, can be difficult due to polymer chain entanglement. The polyimide can be quantitatively removed by selective chemical decomposition of the polyimide phase to form the final porous article. This method of porous PAEK material preparation is referred to as the reactive porogen removal process, RPR. In some embodiments a ternary blend of PAEK/polysulfone/polyimide is utilized.

Polyimides that form a compatible precursor blend with poly (aryl ether ketone) polymers are defined as polymers containing

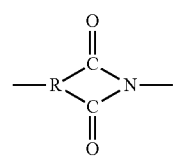

linkages and include aliphatic and aromatic polyimides, copolyimides and polyimide block and graft copolymers, wherein the polyimide is defined as a molecule that contains at least two imide linkages. Additional polyimides include aromatic polyamide imides, polyhydrazine imides and polyester imides.

Aromatic polyimides are particularly useful for the preparation of porous articles of this invention. The most preferred polyimide is poly (ether imide), PEI, of the following formula:

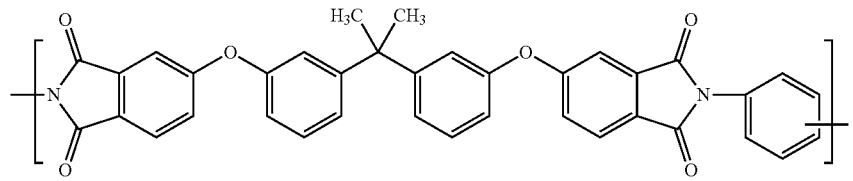

and poly (ether imide) copolymers manufactured by the Sabic Industries under trade names Ultem® 1000, Ultem® XH1010F, Ultem® 6050 and Siltem® STM1500. The copolymers that contain dimethylsiloxane or sulfone units are examples of representative copolymers. Another preferred polyimide is Aurum® manufactured by Mitsui and distributed by DuPont Engineering Polymers.

The polyimides can be used as a single additive component or as a mixture of polyimides. The polyimides typically have an average molecular weight in the range of 500 to 1,000,000 Daltons, preferably between 1,000 to 500,000 Daltons.

Mixtures of poly (ether imide) with poly (ether sulfone), PES, poly (ether ether sulfone), PEES, or polycaprolactone as well as PEI mixtures with soluble nanoparticles are also within the scope of the present invention. The preferred soluble nanoparticles are salt nanoparticles, such as sodium chloride nanoparticles available from Nanoshel. The additional pore forming components supplement the PEI pore forming material and augment pore structures formed from bicomponent PAEK/PEI blends. These supplemental additives are considered compatible PEI components. PAEK substrates prepared from blends containing multiple pore forming components exhibit bimodal pore distributions that combine mesopores below 50 nanometer size with macropores above 0.1 micron size. The PAEK substrate with this combination of pore sizes can provide a decrease in pressure drop across the media in the flow though configuration. The PAEK polymer concentrations in blends containing multiple pore forming components range from 20 to 60 percent by weight, while PEI/supplemental compatible component weight ratios in the multi component blends range from 20/80 to 80/20. Multicomponent compositions formed from blends of PAEK with PEI and nanoparticles exhibit higher fluxes. The concentration of poly (aryl ether ketone) in these multicomponent blend composition ranges from 20 to 60 percent by weight and the nanoparticles weight ratios to the total amount of pore forming materials in the multi component blends range from 20/80 to 80/20.

The formation of the binary poly (aryl ether ketone) blend with the polyimide or multicomponent blends can be carried out by mixing components in a molten stage, such as by melt compounding, and other methods conventionally employed in the polymer compounding industry. The use of a twin extruder is the preferred method of blending. A plasticizer can be optionally added to aid processing. The poly (aryl ether ketone)/polyimide blends form compatible blend compositions. The compatible blend typically exhibits a single glass transition temperature. The compatible composition is defined as capable of forming mesoporous poly (aryl ether ketone) articles with inter-connected pore structure and majority fraction of pore volume having pore diameter in the range of 5 to 100 nanometers. Preferred blends are PEEK/PEI blends that form poly (aryl ether ketone) articles with inter-connected pore structure and an average pore diameter of 50 nm or less. The multicomponent PEEK/PEI/compatible additive blends that form poly (aryl ether ketone) articles with inter-connected pore structure and bimodal pore distribution with combination of meso and macro pores are also preferred. The mesopore diameter is below 50 nanometers while macropore diameter is in the range of 0.1 to 5 micron. The specific membrane separation requirements determine the desired pore size and pore size distribution that in turn is determined by PAEK and polyimide selection and by PAEK/PEI ratio. Incorporation of supplementary PEI competitive additives into blend compositions and downstream processing conditions, such as crystallization protocol, further affect PAEK substrate morphology and can be used to tailor porous structure towards the specific composite membrane preparation.

Blends suitable for preparation of porous articles in accordance with this invention comprise from about 20 to about 60 weight percent of the poly (aryl ether ketone) polymer component, preferably from about 25 to about 50 weight percent of the poly (aryl ether ketone) component, most preferably from 35 to 50 weight percent.

In addition to the supplemental PEI compatible additive compounds listed above, blends can contain solvents to reduce blend viscosity, stabilizers, pigments, fillers, such as catalytic particles, plasticizers, and the like.

The poly (aryl ether ketone)/polyimide blends can be fabricated into a flat sheet film, a hollow fiber, a frit, a monolith or other desired shape precursor substrates by melt extrusion, casting, compression molding or injection molding. The preferred membrane configuration is the hollow fibers. The hollow fiber preferably possesses an outside diameter from about 50 to about 1000 micrometers, more preferably from about 80 to about 500 micrometers, with a wall thickness from about 10 to about 100 micrometers. In the case of films and frits, the media thickness can fall within a broad range, the thickness being limited by the pressure drop for the flow-through process configuration. Flat sheet films may be optionally supported by a non-woven material or by a screen. The article configuration will depend on the intended use. Prior to polyimide phase removal, the article is preferably crystallized to attain the desired degree of crystallinity and crystalline morphology of the PAEK phase. As discussed above, the annealing can take place during the solidification step through control of the cooling rate or by a subsequent combination of solvent induced crystallization and thermal treatment.

The removal of the polyimide component from the blend can be effectively carried out by the reactive porogen removal process, RPR, utilizing reagents that decompose the polyimide into low molecular weight easily extractable fragments. The suitable classes of reagents include, but are not limited to, ammonia, tetraalkylammonium hydroxides, hydrazine, alkylhydrazines, hydroxyalkylhydrazine, primary aliphatic amines, or secondary aliphatic amines. In some embodiments, the reagent that affects polyimide decomposition is diluted with a solvent and/or contains water. Examples of suitable solvents include alcohols, ketones, hydrocarbons, water, and aprotic solvents such as NMP, DMF, and the like. Amine reagents suitable to decompose the polyimide phase in accordance with this invention include, but are not limited to, primary and secondary amines, such as methylamine, ethylamine, propylamine, butylamine, ethylenediamine, propylenediamine, butylenediamine, morpholine, piperazine, monoethanolamine, ethylethanolamine, diethanolamine, propanolamine, dipropanolamine, and mixtures thereof. Commercially available amine mixtures, such as Ucarsol®, can be also employed. The preferred amines include hydrazine, monoethanolamine, tetramethylammonium hydroxide, and their mixtures with alcohols, such as methanol, ethanol, isopropanol, or butanol, ketones, water, and aprotic solvents. The most preferred reagents for the decomposition of the polyimide phase are monoethanolamine, MEA, hydrazine and tetramethylammonium hydroxide.

The decomposition and removal of the polyimide component can be carried out at an ambient temperature, but preferably is carried out at elevated temperatures to facilitate the decomposition process and the removal of decomposition products. Preferably, the polyimide decomposition process and the removal of the low molecular weight decomposition product are carried out concurrently in a common solvent media. The comprehensive removal of decomposition products requires additional washing. In one embodiment of this invention, the polyimide decomposition and removal process is carried out at temperature from about 50° C. to about 180° C., preferably from about 80° C. to 150° C. The time required to fully decompose polyimide and to remove products of the decomposition process from the article will depend on the shape, crystalline morphology, the amount of PEI fraction and the thickness of the article as well as process conditions, including reagent concentration, agitation rate, temperature and the like, as will be recognized by those skilled in the art. The thus formed porous poly (aryl ether ketone) article is then washed with an alcohol, water, or other suitable solvent and dried.

PAEK substrates used to form composite membranes of this invention exhibit a nanoporous surface. The nanoporous PAEK substrates are characterized by an asymmetric pore structure with smaller size surface pores and larger size interior pores. The composite functionalized separation layer is formed at the surface layer. The surface layer exhibits a narrow pore size distribution with an average pore diameter below 70 nanometers, preferably between 20 and most preferably 5 nanometers or below. The interior membrane pore structure exhibits pore size larger than the surface layer pore size, preferably the interior bulk pore size being is larger than the average surface pore size by a factor of two or more. The PAEK substrates with interior pore structure that combines mesopores and macropores are most suitable for the preparation of high flux composite membranes. The thickness of the surface layer is advantageously below 5 micron, preferably below 1 micron and most preferably below 0.1 micron. The composite separation layer is formed within the surface layer of the substrate or on top of the surface layer. For the asymmetric hollow fiber substrates, the surface layer can be alternatively on the exterior surface or on the interior bore side of the hollow fiber.

Formation of the functionalized PAEK membrane can be carried out via a number of embodiments—(1) ketone groups on pore surfaces of the preformed asymmetric porous PAEK substrate are functionalized, (2) the surface of a dense PAEK substrate still containing the pore forming material is functionalized followed by the removal of pore forming material, or (3) the pore surface of an ultra-thin porous layer of otherwise dense PAEK precursor is functionalized followed by the removal of pore forming material from the bulk of the porous substrate wherein an Janus type membrane is formed consisting of alternating functionalized and virgin porous layers.

In one embodiment of the instant invention, the composite fluid separation membrane is formed by a multi-step process: (a) a solid (non-porous) precursor article of a desired shape is formed from a poly (aryl ether ketone) polymer blend with a pore forming material, (b) benzophenone segments of poly (aryl ether ketone) polymer on the surface of the precursor shaped article are modified with functional groups, and (c) the solid poly (aryl ether ketone) precursor article is converted into a nanoporous membrane by removing the pore forming material. Preferred functional groups are selected from primary, secondary, tertiary or quaternary amine groups, carboxyl group, sulfonic acid group, phosphate group, primary, secondary or tertiary hydroxyl groups, ethylene oxide and sulfhydryl group. In a preferred embodiment, the shaped article undergoes crystallization following step (a) via a sequence of solvent induced crystallization and thermal treatments. Alternatively, the article undergoes crystallization after surface modification step (b). The preferred article shape is the hollow fiber configuration and the preferred pore forming material is polyetherimide.

In another embodiment of the instant invention, the composite fluid separation membrane is formed by a multi-step process: (a) a solid (non-porous) precursor article of a desired shape is formed from a poly (aryl ether ketone) polymer blend with a pore forming material, (b) the surface of the solid poly (aryl ether ketone) precursor article is converted into a thin nanoporous layer by removing the pore forming material from the surface of the article to a predetermined depth, (c) the thus formed nanoporous layer is modified with functional groups via chemical modification of ketone groups in benzophenone segments of poly (aryl ether ketone) polymer, and (d) a porous composite membrane is formed by removing the remaining pore forming material from the interior of the poly (aryl ether ketone) precursor article. In some embodiments of the invention, steps (b) and (c) take place simultaneously. It is within the scope of the invention to crystallize the article following step (a) via a sequence of solvent and thermal treatments that generates an asymmetric pore structure. The preferred article shape is the hollow fiber configuration and the preferred pore forming material is polyetherimide. Preferred functional groups are selected from primary, secondary, tertiary or quaternary amino groups, carboxyl group, sulfonic acid group, phosphate group, primary, secondary or tertiary hydroxyl groups, ethylene oxide and suflydryl group. The nanoporous layer formed in step (b) exhibits an average pore size between 5 and 70 nm and the thickness of the porous layer formed in this step is preferably below 10 micron and most preferably below 1 micron.

In another embodiment of the instant invention, the fluid separation membrane is formed by a multi-step process: (a) a solid (non-porous) precursor article of a desired shape is formed from a poly (aryl ether ketone) polymer blend with a pore forming material, (b) the article is subjected to a treatment step wherein poly (aryl ether ketone) polymer undergoes crystallization, (c) the solid poly (aryl ether ketone) precursor article is converted into a nanoporous substrate by removing the pore forming material, and (d) the nanoporous substrate is modified with functional groups to form a membrane. Preferably, the crystallization of the poly (aryl ether ketone) polymer in the blend during step (b) is carried out via a sequence of solvent and thermal treatments that generates an asymmetric pore structure. The preferred article shape is the hollow fiber configuration and the preferred pore forming material is polyetherimide. Preferred functional groups are selected from primary, secondary, tertiary or quaternary amine groups, carboxyl group, sulfonic acid group, phosphate group, primary, secondary or tertiary hydroxyl groups, ethylene oxide and sulfhydryl group. The nanoporous layer of the membrane exhibits an average pore size between 5 and 70 nm.

In one example, a nanoporous precursor article is prepared from a blend of PAEK polymer with a pore forming material (porogen). A precursor non-porous article is prepared from the PAEK/porogen blend by melt processing and is initially amorphous. The precursor amorphous article undergoes crystallization by subjecting the article to a solvent treatment step. The solvent and the treatment conditions are selected to affect crystallization of PAEK polymer phase in the article. The crystallization by the solvent treatment is carried out to limit the crystallization to the surface region of the article only. The solvent induced crystallization is diffusion controlled. Thus, the depth/thickness of the surface crystallized region can be controlled by the duration of the treatment and temperature among other factors. The solvent treatment step is further followed by a thermal annealing step. The porogen acts as a pore forming material and is removed following the crystallization step to provide the initial porous PAEK substrate article. The porous surface of the article is modified by functional groups to form the fluid separation membrane. In some embodiments, the surface functionalization is carried out following the thermal annealing step and prior to the porogen removal step. In some embodiments, the surface functional groups are further reacted with extender groups to modify pore size and membrane surface characteristics.

In some embodiments, formation of the porous PAEK substrate and its surface modification are carried out simultaneously. Namely, if the porous PAEK article is formed by the RPR process utilizing a primary amine, the reaction can be carried out under conditions that affect both the formation of the porous PAEK article and the modification of the porous PAEK article via ketimine group formation in a single step process. Carrying out the RPR process at elevated temperatures, preferably above 80° C., most preferably from about 100° C. to about 140° C., in an anhydrous reaction media while utilizing a high concentration of a primary amine reagent, leads to the formation of a porous and functionally modified PAEK substrate in a single step.

In one such example, a porous PEEK substrate is modified with $\approx C{=}N{-}CH_2CH_2OH$ groups in a single step process from PEEK/PEI blend by reacting the precursor blend article with neat monoethanolamine at about 120° C. The ketimine group can be hydrolytically unstable. To improve hydrolytic stability the ketoimine group can be reduced using a mild reducing agent to form a stable secondary amine.

In some embodiments, it is desirable to form the initial porous PAEK articles without affecting surface modification. The preformed unmodified nanoporous PAEK article is then modified in a following step with target functional groups. This enables preparation of PAEK membranes tailored towards the target separation. To form an unmodified porous PAEK article by the RPR process, the precursor PAEK/PI blend article is contacted with a primary amine under conditions that suppress ketimine group formation, i.e., at moderate temperatures and in a relatively dilute amine solution that preferably further contains water. It will be recognized by those skilled in the art that, by selecting balanced reaction conditions, the PAEK modification via formation of imine linkages can be largely suppressed while an adequately high rate of polyimide phase decomposition and removal is still maintained. For example, the RPR process can be carried out utilizing monoethanolamine/ dimethylformamide/water mixture 20/70/10 by volume at 80° C., which provides for a porous PAEK article formation while suppressing functionalization via the imine group formation. However, if the ketimine groups were still formed during the RPR process they can be removed in a subsequent step via hydrolysis.

The nanoporous PAEK membrane of this invention preferably has an asymmetric pore structure or a graded pore size distribution across the thickness of the porous wall. It is also within the scope of the invention to have a combination of an asymmetric and graded pore morphology. In one example, the substrate wall is composed of distinct layer regions of variable pore size and/or pore volume. It is preferable to form composite membranes utilizing a porous substrate with graded pore size structure wherein the surface layer exhibits smaller average pore diameter as compared to the interior pore size. One method of forming the multi-layer media of this invention is by coextrusion to form asymmetric pore configurations. Multilayer films or frits can be also formed by compression molding or by calendaring together preformed sheets of variable PAEK composition. The preferred method of forming multilayer substrates is by coextrusion. The method is particularly useful to form multilayer porous hollow fibers. The method provides for preparation of substrates with 2 to 10, preferably 2 to 4, distinct layers of variable blend composition and thus variable pore size and pore volume.

One preferred method of forming an asymmetric PAEK substrate is via the sequential crystallization process of the amorphous precursor. The surface of the shaped substantially amorphous PAEK/blend precursor formed by melt processing is treated initially by contacting with a solvent capable of crystallizing PAEK polymer phase. The crystallization proceeds slowly as the solvent diffuses from the surface inwards. The solvent treatment time is controlled to affect surface layer crystallization to a desired depth only. After PAEK polymer in the surface layer of the desired thickness is crystallized the process is terminated. The solvent treatment step is followed by a thermal annealing to complete the crystallization throughout the entire substrate material. Following the removal of the pore forming material from the crystallized substrate an asymmetric morphology is formed with a surface layer containing substantially smaller size pores and with an interior composed of larger size pores. In some embodiments, the initial PAEK precursor is a multilayer structure formed by coextrusion of different blend compositions. The sequential crystallization process affects formation of an asymmetric layer in one of graded porosity layers formed by coextrusion.

The preformed shaped PAEK substrate is converted into a fluid separation membrane tailored towards a specific application via surface functionalization with target functional groups. The specific functionalization process methodology provides for membranes with different separation characteristics. The following functionalization approaches are utilized: (1) The surface of an asymmetric nanoporous PAEK substrate is functionalized to form a surface separation layer of a desired pore size and functionality. The surface layer can be further modified via reaction with functional extender molecules. (2) The surface of as formed amorphous shaped PAEK blend precursor is functionalized with target functional groups. The article is subjected to the crystallization step and the pore forming agent is removed. The thus formed nanoporous composite PAEK membrane is formed with an ultra-thin surface separation layer. The surface layer can be further modified via reaction with functional extender molecules. (3) The shaped amorphous precursor article is crystallized via a sequence of solvent and thermal annealing steps. The surface is functionalized with target functional groups. The pore forming material is removed and the article is converted into a composite membrane with an ultrathin functionalized surface separation layer. The surface layer can be further modified via reaction with functional extender molecules. (4) The shaped amorphous precursor article is crystallized via a sequence of solvent and thermal annealing steps. The pore forming material is removed from the surface of the substrate to a predetermined depth to form a thin porous layer. The porous surface layer is functionalized with target functional groups. The remaining pore forming material is removed from the interior of the substrate and the article is converted into a composite membrane with an ultrathin functionalized surface porous separation layer. The surface layer can be further modified via reaction with functional molecules.

In one example, a hollow fiber is formed by coextruding two PAEK/PEI blends of different blend composition. After the PEI phase is removed, a porous substrate with two layers with distinctly different pore size and pore volume is formed. The surface layer with the smaller average pore size is functionalized to form the composite membrane. The asymmetric pore structure provides for a reduced resistance to fluid flow. It is also within the scope of the present invention to form a substrate with more than two layers that differ in pore size. The multi-layer porous substrate may contain porous layers that differ by at least about 10% in the average pore size or by at least about 5% in the pore volume impart certain advantages to the mechanical and functional characteristics of the membrane. For example, the multi-layer porous membrane can exhibit good mechanical properties while providing a higher fluid flux. The multi-layer porous substrate is preferably formed from two or more PAEK/polyimide blends that differ in blend chemical composition. The blends can contain different PAEK polymers, different polyimide polymer components or can exhibit different PAEK/polyimide ratios. The PAEK polymer content of the first blend can differ from the PAEK polymer content of the second blend and any additional blends by between 5 to 50 weight percent of PAEK polymer content, preferably by at least 10 to 25 weight percent.

The multilayer substrate of the desired configuration can contain two, three or more contiguous layers that differ in the average pore size and/or pore volume. Furthermore, the individual layer can vary from about 5% of the overall wall thickness of the substrate to 50% of the overall wall thickness of the substrate. The thickness of each layer can be controlled and can be as thin as 10 micrometers. The layer with the smaller size pores is positioned at the surface and is functionalized to form the separation layer.

It is important to functionalize PAEK membranes while minimizing reduction to crystalline structure. To maintain desired attributes like solvent resistance the degree of crystallinity should be preferably above 20%, most preferably above 30%. The semi-crystalline nanoporous PAEK materials are highly solvent and temperature resistant. Nevertheless aggressive reaction conditions can proceed with modification of both amorphous and crystalline regions leading to loss of mesoporous structure. Thus, the use of aggressive reaction conditions such as high reaction temperature, aggressive solvent media and reagents in combination with excessive reaction time should be avoided to prevent loss of crystalline phase. The use of mild reaction conditions enables modification of pore surfaces without affecting preformed pore structure, morphology and article's shape. It will be recognized by those skilled in the art that a membrane with optimal separation properties can be formed by modifying the PAEK substrate with functional groups appropriate to the synthetic scheme that will optimize the desired pore size and functionality without materially affecting the degree of crystallinity.

In preferred embodiments, the surface functional groups are formed by wet-chemical surface modification procedures on the pre-formed shaped PAEK article that serves as a substrate. The membrane formed via PAEK substrate surface modification can contain amine, carboxyl, acid chloride, aldehyde, isocyanate, ethylene oxide, sulfhydryl or hydroxyl functional groups among others. It is within the scope of the invention to covalently attach extender groups to the surface functional groups to further affect pore size and functionality. In one example, the functionalized porous PAEK substrate is reacted with a functional monomer that forms brush extender groups. The brush extender molecules modify the surface pore size to affect the separation efficiency. Brush extenders include low molecular weight hydrocarbons, oligomers or polymers containing functional groups, such as epoxy groups or primary amino-groups, $-NH_2$. Extender groups can be monofunctional or multifunctional. In case of multi-functional extender groups one set of functional groups is used to attach the brush to the functionalized poly (aryl ether ketone) surface. The attachment of the first targeted multi-functional extender group molecules can be followed by reacting the thus formed layer with an additional set of brush extender molecule's to further affect pore size.

In some embodiments, functional groups on the PAEK substrate's surface are formed in a one-step direct chemical reaction or via a sequence of chemical steps. For example, the PAEK articles prepared as described above can be modified by reducing surface ketone groups to form hydroxyl groups or by reacting ketone groups with multifunctional primary amine reagents via ketimine group formation to impart the target hydroxyl or amine group functionality.

In some embodiments, the PAEK substrate surface is modified first with reactive group intermediates converted to the target functionality in a subsequent step. Examples of such intermediate reactions may include surface lithiation, nitration, aldehyde group attachment or chloromethylation to name a few. The modification of aromatic polymers with these functional groups is generally known in the art and can be deployed to functionalize PAEK substrate surfaces. Preferred reactive groups used as intermediates for additional modification steps are amino and hydroxyl groups.

The nanoporous PAEK substrates functionalized with hydroxyl, primary amino groups or sulfhydryl groups are particularly preferred for the composite membrane preparation. The =C=O ketone group in the benzophenone PAEK polymer backbone, in particular, can be used to form functional groups on the PAEK substrate's surface. The high concentration of ketone groups in poly (ether ketone) and poly (ether ketone ether ketone ketone) polymers provide for a high concentration of functional surface groups upon chemical modification.

The C=O ketone group in the PAEK backbone can be reduced to C—OH hydroxy group. Thus, functionalized material can be used directly to form composite membranes with hydrophilic surface characteristics. In some embodiments of this invention, it may be desirable to react the hydroxyl groups with an additional brush extender group. The surface hydroxyl groups can be formed by reducing ketone groups on the surface of the PAEK substrate with a reducing reagent, such as sodium borohydride or lithium aluminum hydride. The surface hydroxyl groups can be further introduced by forming ≈C=N—R—OH functional groups on the PAEK surface via reaction with primary amines containing hydroxyl groups wherein R is aliphatic or aromatic radical. In one example the ketone groups are reacted with monoethanolamine to form ≈C=N—CH$_2$—CH$_2$—OH functional groups. Direct reduction of ketone groups on the mesoporous surface of PAEK to form diphenylmethanol functional units,

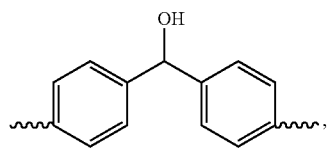

is particularly preferred. The formation of diphenylmethanol units in PEEK backbone is further illustrated schematically below:

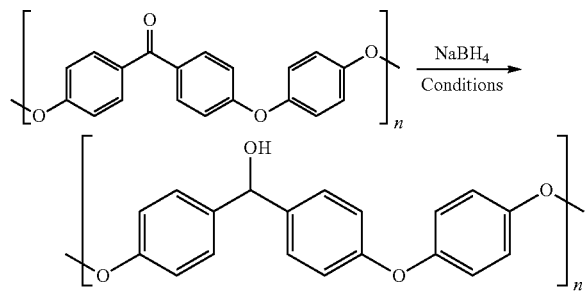

The surface functionalization with —OH groups can be carried out on a preformed porous asymmetric PAEK membrane or utilizing a non-porous shaped PAEK article containing pore forming material followed by pore forming material removal to form the final asymmetric surface functionalized membrane. It is desirable to conduct surface functionalization without affecting crystalline phase. Loss of crystallinity during functionalization, including functionalization by —OH groups, can lead to a loss of preformed pore morphology. Loss of crystalline phase can further lead to the loss of solvent resistance. The functionalization via modification of ketone groups is best carried out under reaction conditions that minimize chemical alteration of crystalline phase.

A number of reducing agents known in the art can be utilized including NaAlH$_4$ and NaBH$_4$. Use of mild reducing agents such as NaBH$_4$ is preferred to preserve crystalline structure and pore morphology in preformed asymmetric PAEK membranes. The use of mild reaction conditions such as the use of least aggressive solvents and modest reaction temperatures is further preferred. In some embodiments the surface functionalization of non-porous preformed PAEK articles can be carried out under more aggressive conditions since the underlying pore morphology is formed following functionalization. The preferred method of ketone group reduction is the use of NaBH$_4$ reagent in isopropyl alcohol, IPA, solution or tetrahydrofuran, THF, solution that further contains polyethylene glycol, PEG, such as PEG 500. It was found surprisingly that the addition of PEG provides for improved reaction conditions and consumption of the reducing reagent.

Figure 1B:
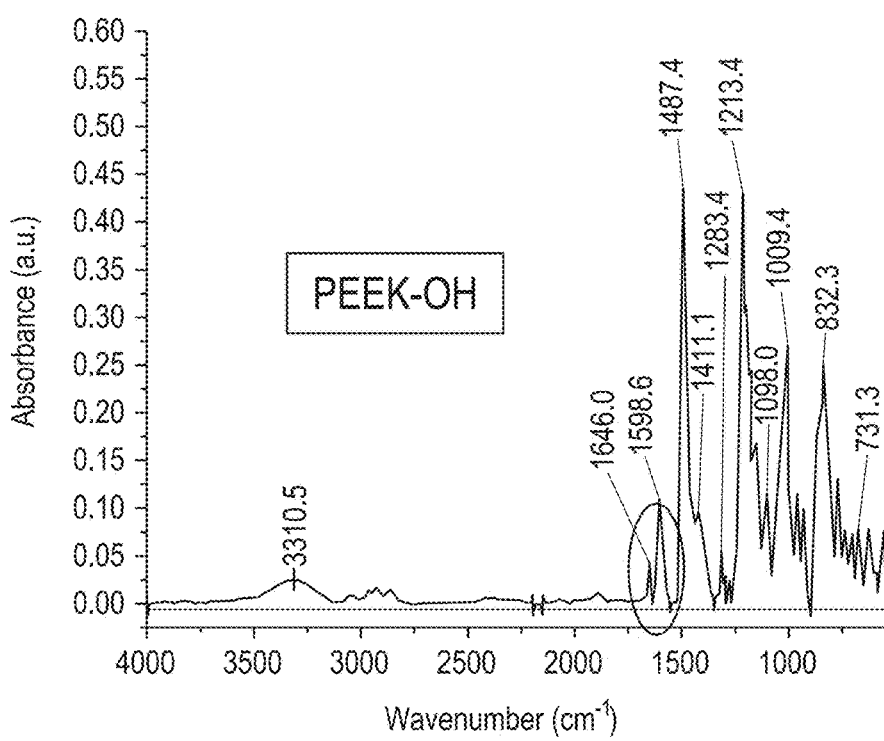

The degree of substituting by functional groups can be controlled via reagent concentration, reaction conditions (in particular temperature) and reaction's duration. The formation of functional groups can be followed by AT-FTIR spectroscopy, XPS spectroscopy or other methods known in the art. The AT-FTIR spectra of PEEK hollow fiber and PEEK-OH hollow fiber are shown in, respectively, FIGS. 1A and 1B. In the spectra of PEEK and PEK there are two peaks associated with carbonyl group; a main feature is the carbonyl asymmetric stretching peak at around 1644 cm$^{-1}$ for both polymers, and the skeletal vibration at 1651 cm$^{-1}$ in PEEK and 1655 cm$^{-1}$ in PEK. The skeletal in-plane vibration of the phenyl rings at 1498 cm$^{-1}$ is present in all PAEK polymers. Following surface reduction, the concentration of ketone groups is reduced and is reflected by the reduction in the intensity of the peak at 1644 cm$^{-1}$. The change in the ratio of 1644 cm$^{-1}$ peak as related to the phenyl rings at 1498 cm$^{-1}$ can be used to follow the progress of ketone group reduction. The reduction of the ketone group is accompanied by the appearance of —OH stretching vibration in AT-FTIR spectra.

Figure 3A:
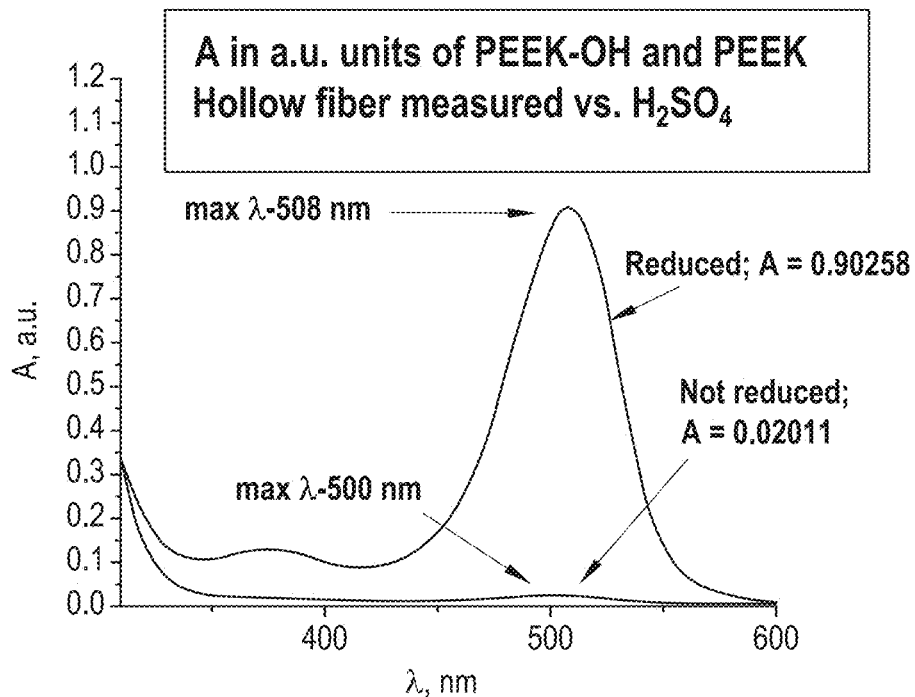
FIGS. 3A and 3B show UV-VIS spectra of PEEK-OH hollow fiber dilute solution in sulfuric acid, with FIG. 3A showing PEEK-OH and precursor PEEK at identical concentration measured against pure sulfuric acid, and with FIG. 3B showing PEEK-OH measured against precursor PEEK at identical concentrations in sulfuric acid.
Figure 3B:
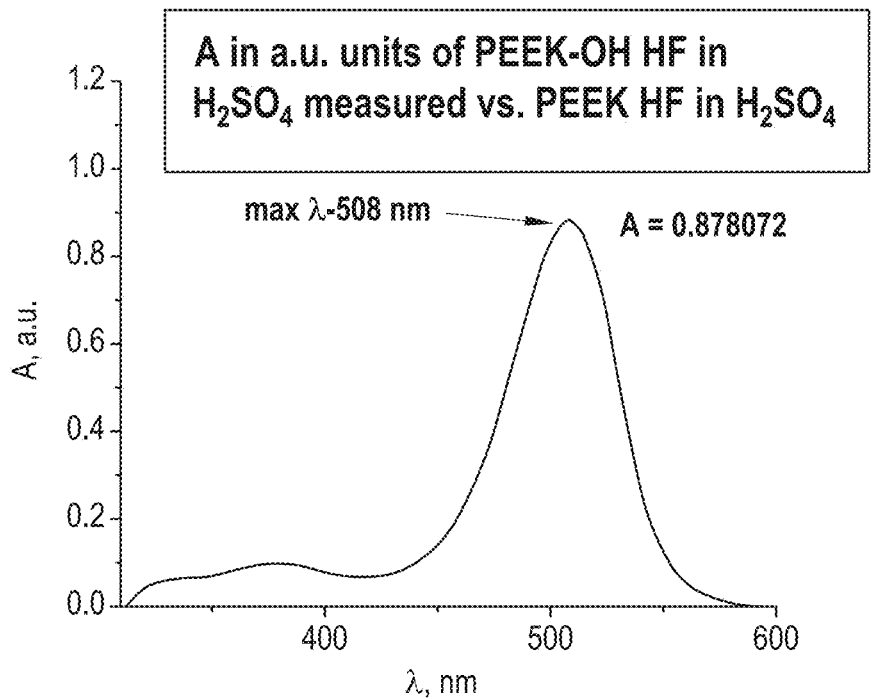
Figure 4A:
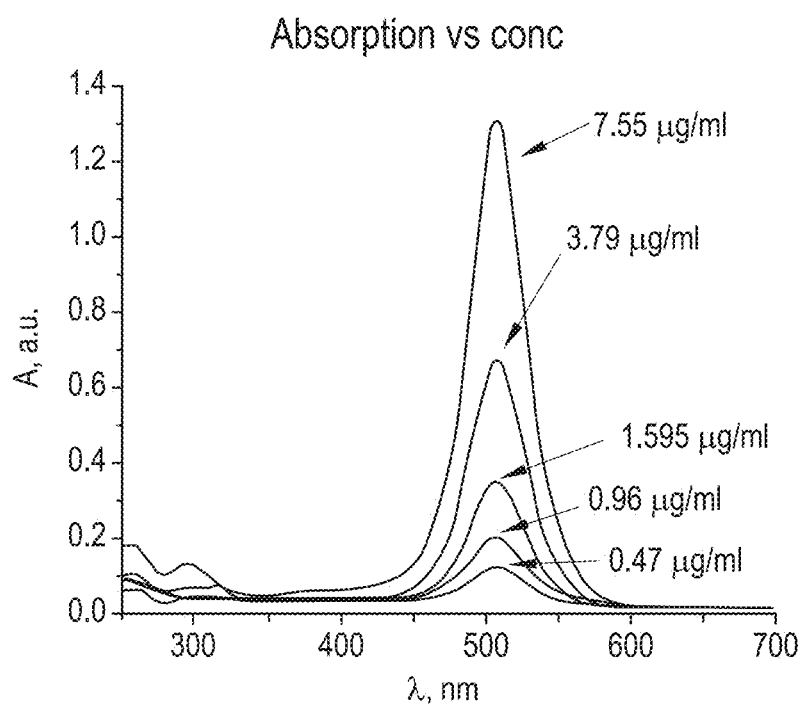
Figure 4B:
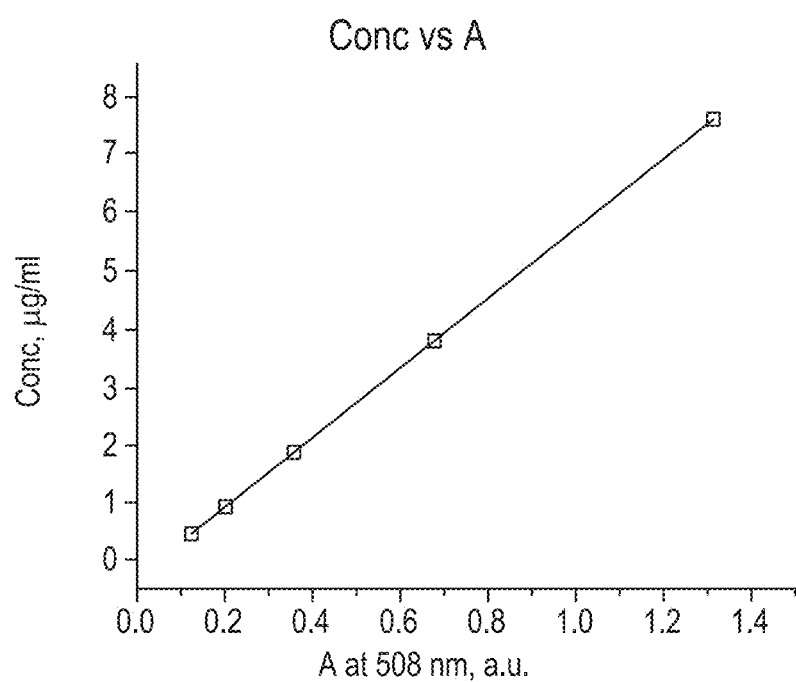
FIG. 4B shows a corresponding calibration curve using the absorption peak at 508 nm.

However, a quantitative determination of functional group concentration by surface measurement methods can be difficult. The concentration of —OH groups in PAEK-OH materials can be measured quantitatively by UV-VIS spectroscopy as follows: the PAEK-OH materials form a distinct red color upon dissolution in concentrated sulfuric acid. Sulfuric acid is essentially the only solvent capable of dissolving semi-crystalline PAEK materials at room temperature. The color of PAEK-OH solutions is distinctly different from the color of the unmodified material dissolved in sulfuric acid. The UV-VIS spectra of both PEEK-OH and PEEK solutions are shown in FIGS. 3A and 3B. The model compound MBPPM-bis(4-(4-methoxyphenoxy)phenyl)methanol dissolved in sulfuric acid was used to measure the concentration of —OH groups in functionalized PEEK materials. Model compound MBPPM was synthesized and the solution of MBPPM in sulfuric acid was used to construct a calibration curve using the absorption peak at 508 nm. The UV-VIS spectra of MBPPM dissolved in sulfuric acid and the calibration curve are shown in FIGS. 4A and 4B, respectively. The calibration curve was used to measure concentration of —OH groups in mesoporous PEEK membranes functionalized under different protocols.

The UV-VIS method of measuring hydroxyl group concentration is highly sensitive and allows determination of the concentration of —OH groups in surface functionalized PEEK-OH materials. The method enables optimization of reaction conditions to control the degree of surface functionalization and the depth of the functionalized surface layer. The concentration of functional groups can be measured as a function of time and represented as a weight concentration (mmol/g units) or as a surface group concentration (μmmol/cm$^2$ units). High concentration of surface groups can be attained in a short reaction duration time. The concentration of surface groups above $1 \times 10^{-5}$ μmol/cm$^2$ is preferred, most preferred is surface group concentration above $5 \times 10^{-5}$ μmol/cm$^2$.

The porous structure of functionalized PEEK-OH materials was further evaluated using nitrogen adsorption BET measurements. The degree of crystallinity of porous PEEK-OH materials was further evaluated by Differential Scanning calorimetry (DSC). The measured heat of fusion was used to calculate the degree of crystallinity. Modification protocols were optimized to attain consistent and controlled modification of the substrate while minimizing changes to the mesoporous pore morphology and degree of crystallinity.

The porous PAEK substrate functionalized with hydroxyl groups can be further converted to the desired new functionality through chemical transformations of —OH groups. For example, the surface of porous PAEK articles can be functionalized with carboxylic groups utilizing a common key-intermediate, the PAEK-OH functionalized material. The latter is obtained by surface reduction of ketone groups in benzophenone linkage. Substitution of the hydroxyl groups, under mild acidic conditions, with 4-ammobenzoic acid and succinamic acid provides for PAEK-Ph-COOH and PAEK-(CH$_2$)$_2$—COOH functionality. The PAEK-OH functionalized material can be reacted with a sultone, for example 1,4-butane sultone, under basic conditions to form sulfonic acid functionalized surface.

A broad method of PAEK substrate functionalization is via reaction of the ketone group in PAEK backbone with a functional hydrocarbon containing a primary amino group. In this embodiment, the ketone groups in poly (aryl ether ketone) backbone are reacted with a low molecular weight hydrocarbon, oligomer or a polymer containing primary amino-functional groups ~NH$_2$ and additional functional groups that affect separation characteristics of the separation layer. The attachment of the target molecule to the substrate is thus carried utilizing the primary amino group and is completed via the ketimine group formation. In some embodiments, this reaction is followed by the ketimine group reduction to form a durable covalent bond of molecules containing functional groups attached to the PAEK surface separation layer.

The attachment of a functional hydrocarbon molecule to the PAEK substrate's surface layer via formation of the ketimine linkage is further illustrated below:

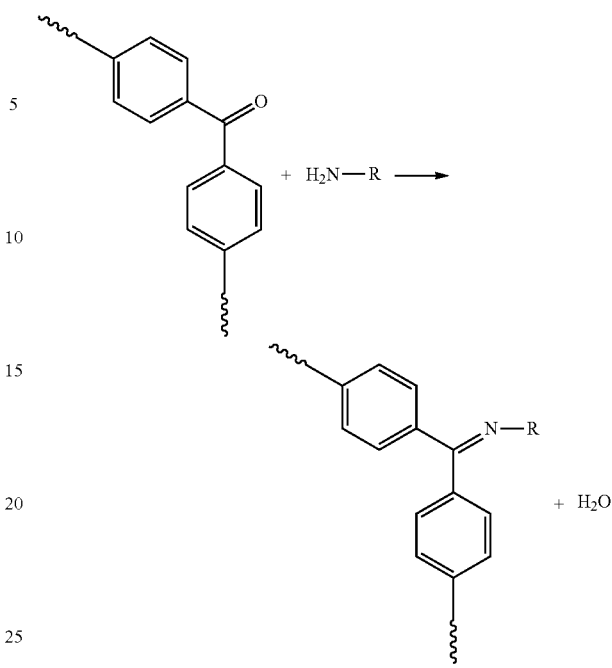

wherein R is a low molecular weight hydrocarbon, oligomer or a polymer containing primary amino-functional groups ~NH$_2$ and at least one additional functional group, such as hydroxyl group, amino group, carboxyl group or sulfhydryl group, wherein R is an aliphatic, a heterocyclic or an aromatic radical. Difunctional and multifunctional amines are particularly preferred. Examples of difunctional amines include ethylenediamine, propylenediamine, iso-butylenediamine, 1,4-diaminobutane, diethylenetriamaine, tetraethylenepentamine, ethylethanolamine, diaminocyclohexane, phenylenediamine, toluenediamine. R radical can contain multiple amino groups to provide PAEK separation layer with a high concentration of functional groups. Molecules containing a high concentration of primary amino groups are particularly preferred. Polyvinylamine, polyethylene imine or poly (ethylene glycol) diamine of controlled molecular weight are utilized to form the separation layer on the surface of PAEK substrate with a controlled molecular weight cutoff and pre-determined functionality. Poly (ethylene glycol) diamine of the general formula

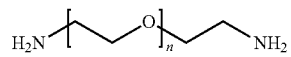

is used to form separation layers with antifouling characteristics, wherein n can range from 3 to 12. PAEK media with PEG-NH$_2$ functionality can be reacted with functional molecules in a following step to further modify separation layer pore size and functionality.

In some embodiments, the H$_2$N—R molecule containing hydroxyl functional groups, rather than an additional amino group, is utilized. Hydroxyl groups functionalize the separation layer an impart hydrophilic surface properties. R radicals containing tertiary, secondary or primary alcohol groups are attached to the PAEK porous surface via the Schiff base ketimine linkage formation (R is an aliphatic, an aromatic or heterocyclic hydrocarbon radical). The R radical can further contain multiple hydroxyl groups. In some embodiments, it is desirable to reduce the ketimine linkage to form a secondary amine. The secondary amine group is hydrolytically more stable. In some embodiments, the secondary amine group is further alkylated to form a tertiary amine.

The functionalization of PAEK media surface with ≈C=N—CH$_2$CH$_2$OH groups can be carried out by reacting ketone groups in the PAEK backbone with monoethanolamine. This can be conveniently carried out during a RPR process wherein the porous structure and functionalization take place simultaneously. Alternatively, the preformed mesoporous PAEK is reacted with monoethanolamine in a separate step. Other aliphatic amino functional alcohols, such as diethanolamine, propanolamine, dipropanolamine, or 4-amino-1-butanol, can be utilized. One preferred H$_2$N—R—OH linker molecule is amino functionalize poly (ethylene glycol). The H$_2$N—R—OH molecules containing aromatic rings is another class of functional groups.

Preparation of amino functional media via Schiff base linkage in some embodiments is followed by the ketimine group reduction. In the first step, the porous PEEK is reacted with a difunctional hydrocarbon radical, H$_2$N—R—NH$_2$. In the second step, the ketimine group is reduced using a reducing agent such as sodium cyanoborohydride, NaBH$_3$CN, to form PEEK—NH—R—NH$_2$ functionalized surface. R is an aromatic, heterocyclic or aliphatic radical that can contain additional functional groups.

In another preferred embodiment of the invention, the polymer backbone in the mesoporous PAEK substrate is modified to form benzhydrylamine functional units on the PAEK surface

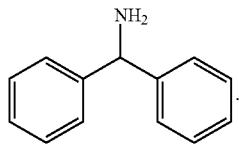 [SMILES: NC(c1ccccc1)c1ccccc1]

Multiple methods of forming functional benzhydrylamine groups via modification of benzophenone are known in the art. In some approaches, multiple reaction steps are used to form the benzhydrylamine functionality. In one method, the porous substrate is reacted first with the hydroxyamine to form oxime intermediate. In the second step, the oxime is reduced with LiAlH$_4$ to form benzhydrylamine. However, the formation of some secondary amine can take place as a side reaction. In another method, the porous substrate is reacted first with NaBH$_4$ to form the diphenyl methanol unit which is followed by reacting the diphenyl methanol with HBr. In the next step, the substrate is reacted with ammonia to form benzhydrylamine functionality. This method involves a large number of steps and can generate surface crosslinking. In a further method, the porous substrate is reacted first with the HCO$_2$NH$_4$ to form diphenylformamide. In the second step, the formamide is hydrolyzed with strong HCl to form benzhydrylamine groups. This method is a modification of the Leuckart reaction and is preferred.

To form benzhydrylamine functionality following the Leuckart method, the porous PAEK substrate is reacted with the ammonium formate at 170° C. for 4 hours under argon (ammonium formate boils at 180° C.). The porous PAEK media is highly temperature and solvent resistant and harsh conditions can be implemented without a major effect on the porous structure. The porous media is washed extensively with water to remove decomposition products of HCO$_2$NH$_4$ that may include ammonia and formamide. In the final step, the porous article is treated with 1N HCl to convert diphenylformamide into protonated benzhydrylamine groups and washed with water. The HCl is removed by washing with a dilute NaOH solution, followed by washing with water and the final functionalized substrate dried under argon.

The porous functionalized PAEK membranes prepared as described above can be further reacted with functional monomers to modify membrane separation characteristics further. The functional groups on PAEK porous membrane surface are used to covalently attach hierarchically a new set of functional groups to the surface of the PAEK substrate to form nanoporous composite membranes with progressively lower molecular weight cut off characteristics. The porous PAEK substrate functionalized with primary amino groups is further modified by reactions with functional monomers or brush extender groups. Multifunctional monomers containing acid chloride, isocyanate and epoxy groups are particularly preferred. In one example, the separation layer is formed on the surface of the PAEK substrate via the flowing sequence of reaction steps: (a) forming functional groups on the surface of PAEK substrate, (b) reacting thus formed functional groups with a multifunctional monomer A and (c) reacting the surface modified with monomer A with a multifunctional monomer B. In some embodiments, both monomers can be a mixture of monomers and are applied from solutions by a wet chemistry process. The multifunctional monomer A has a general formula R(X)$_n$ wherein R is an organic moiety selected from aromatic, aliphatic, alicyclic or heterocyclic groups and combinations thereof; X is a functional group selected from a primary or secondary amino group, acid chloride group, hydroxyl group, sulfhydryl group, aldehyde group, epoxy group or isocyanate group; n represents an integer of 2 or more. In some embodiments, the functional group is part of the heterocyclic radical. The multifunctional monomer B has a general formula R'(Y)$_n$ wherein R' is an organic moiety selected from aromatic, aliphatic, alicyclic or heterocyclic groups and combinations thereof; Y is a functional group selected from a primary or secondary amine group, acid chloride group, hydroxyl group, sulfhydryl group, aldehyde group, epoxy group or isocyanate group; n represents an integer of 2 or more. In some embodiments, the functional group is part of the heterocyclic radical. The functional groups of the substrate, the monomer A and the monomer B are selected to form covalent bonds. In a most common embodiment, the PAEK surface is functionalized with primary amine or hydroxyl groups, the functional group of monomer A is an acid chloride group, —COCl, or an epoxy group and the functional group of the monomer B is a primary or secondary amino group, —NH$_2$, =NH. The functionalized separation layer exhibits a narrow pore size distribution with an average pore diameter below 50 nm, preferably below 10 nm. In embodiments directed to the RO separation process, the pore size is below 0.2 nm.

The amine group functionalized PEEK hollows are particularly useful for hierarchical sequential additional surface modification to control membrane molecular weight cut off. In one example, the amine functionalized hollow fiber is modified via sequential exposures to trimesoyl chloride, TMC, and meta phenylenediamine, MPD. The amine functionalized PAEK substrate was reacted first with the carboxylic acid chloride functionality of TMC in a reticulate synthesis. In the following step, the carboxylic acid chloride functionality of the modified substrate is reacted with amine functional groups of MPD. A membrane module is constructed utilizing amine functionalized PEEK hollow fibers.

The solution of reactants and washing fluids is introduced on the bore side of hollow fibers through the feed side port of the module. The reservoir containing solutions of reactants and washing fluids were maintained under argon. Dilute solutions of TMC in toluene and MPD in toluene (0.05M) are prepared for the two reaction steps in the deposition cycle. Dry toluene and acetone solutions are prepared for rinse steps in the deposition cycle. In the first step, the PEEK substrate surface is contacted with the dilute TMC solution in toluene which reacts with pendant amino groups. The solution is introduced into hollow fiber bores and after 20 s of exposure time, the solution is removed, replaced by toluene and the substrate rinsed with toluene. The excess of toluene is removed under a flow of argon. At this stage of the cycle, the surface contains an excess of unreacted acid chloride groups. In the following half cycle, the PEEK substrate surface is further reacted with the dilute MPD solution in toluene for 20 s. The solution is removed, replaced by acetone and the substrate washed extensively with acetone to remove any excess of MPD. At the end of the first complete cycle, the substrate surface contains an excess of amine groups that are reactive to TMC. The reticular synthesis and the deposition cycles can be continued. The number of reticulate cycles affects membrane properties. The process is stopped after a membrane with a desired molecular weight cut off is formed. Depending on the monomer composition of the last solution used in the cycle (TMS or MDA), the surface of the composite layer will have an excess of amino or acid chloride groups. Carboxylic acid groups are formed upon hydrolysis of acid chloride groups. The presence of these functional groups can contribute to the tailored separation properties of the membrane. To impart antifouling properties to the membrane, an additional distinct layer can be formed on the surface. To provide anchoring sites for this layer formation, the TMC solution is used as the terminal step in the cycle. The acid chloride groups on the surface of the composite layer are reacted with the amino-functional polyethylene oxide to form the anti-fouling layer.

It is within the scope of the invention to covalently attach extender groups to the surface functional groups to further affect pore size and functionality. In this step, the porous PAEK substrate functionalized with hydroxyl or primary and secondary amino groups is reacted with brush extender groups. The brush extender molecules modify the surface pore size to affect the separation efficiency. Brush extenders include low molecular weight hydrocarbons, oligomers or polymers containing functional groups, such as epoxy groups, acid chloride groups or isocyanate groups. Extender groups can be monofunctional or multi-functional. In case of multi-functional extender groups one set of functional groups is used to attach the brush to the functionalized poly (aryl ether ketone) surface. The attachment of the first targeted multi-functional extender group molecules can be followed by reacting the thus formed layer with an additional set of brush extender molecule's to further affect pore size.

Ethylene oxide, propylene oxide and butylene oxide oligomers are particularly preferred as brush extender molecules due to their antifouling characteristics. Extender groups can be monofunctional or multi-functional. Multifunctional brush extender molecules containing epoxy functional groups are particularly preferred. These include poly (ethylene glycol) diglycidyl ethers of different molecular weights, trimethylolpropane triglycidyl ether, tris(4-hydroxyphenyl)methane triglycidyl ether, glycerol diglycidyl ether, resorcinol diglycidyl ether, bisphenol A diglycidyl ether available commercially as DER™ 332, commercially available tetraphenolethane tetraglycidylether (EPON™ Resin 1031) and mixtures thereof. The reaction of surface hydroxyl groups with epoxy functional oligomers can be complicated by the competition of the new hydroxyls formed during initial reaction further reacting with the starting epoxide. Tertiary amines are used to catalyze the reaction. A mixture of oligomers that differ in functionality can be further utilized.

A broad range of solvents can be utilized in the functionalization processes. The semi-crystalline structure of the PAEK substrate makes it solvent resistant. Mild swelling may take place in contact with certain aggressive solvents. Aromatic, aliphatic and chlorinated hydrocarbons, aprotic solvents, ethers, alcohols and ketones can be used in the separation layer functionalization reactions as long as the solvent media is not reactive towards reactants. Extensive washing is required after each reticulate synthetic step to remove unreacted monomers.

The PAEK substrate configurations are highly flexible and can be packaged into membrane filter reaction vessels. In these vessels, the substrate is easily accessible to reactants. The PAEK substrate is packaged into a permanent or a temporary housing to carry out the separation layer functionalization. The housing assembly is configured to house flat sheet, such as spiral wound, hollow fiber, or monolith configurations with the hollow fiber configuration preferred. The housing can be jacketed to carry out reactions at a controlled temperature. PAEK hollow fibers are sealed within the housing by forming fluid tight tubesheets. The tubesheets are formed by utilizing thermoset or thermoplastic potting materials. Commercial hollow fiber devices typically contain thousands of hollow fibers. The PAEK initial surface functionalization and/or any subsequent additional modifications can be carried out on the lumen or shell side of hollow fibers. The preformed porous or dense precursor hollow fibers are utilized following procedures described above. Reactants and wash solutions are introduced via the feed port of the housing. The port is connected to a pump or another delivery system to introduce and transport reactants through hollow fibers. The liquid flow rate is controlled to allow for acceptable yield during each reaction step and to reduce reactant wastage. Optionally, the progress of the reaction is monitored continuously by measuring reactant concentration in the exit waste line. The reactant delivery rate can be adjusted to reduce bypass and underutilization of reactants. Upon the completion of each reaction step the process is switched to the next step.

The separation layer functionalization can be further carried out by immersing the precursor PAEK substrate into the reaction media or continuously transporting the substrate through the reaction media. To attain optimal PAEK material surface modification or to improve the efficiency of the modification process, the reaction advantageously is carried out in anhydrous conditions and/or at an elevated temperature. The PEAK substrates are highly temperature and solvent resistant. The reaction temperature during the synthesis can be between 20° C. to 150° C.

The composite poly (aryl ether ketone) membranes of this invention are formed with separation layers of controlled pore size and functionality that in turn address a broad range of fluid separation applications. The applications may include well-established ultrafiltration (UF), nanofiltration (NF) and reverse osmosis (RO) processes. Emerging applications such as organic solvent nanofiltration and the separation and recovery of active pharmaceutical ingredients, APIs, from organic solvent media can be further efficiently addressed by membranes of this invention.

The present invention is described below by examples, which should not be construed as limiting the present invention.

EXAMPLES

Example 1

Figure 5A:
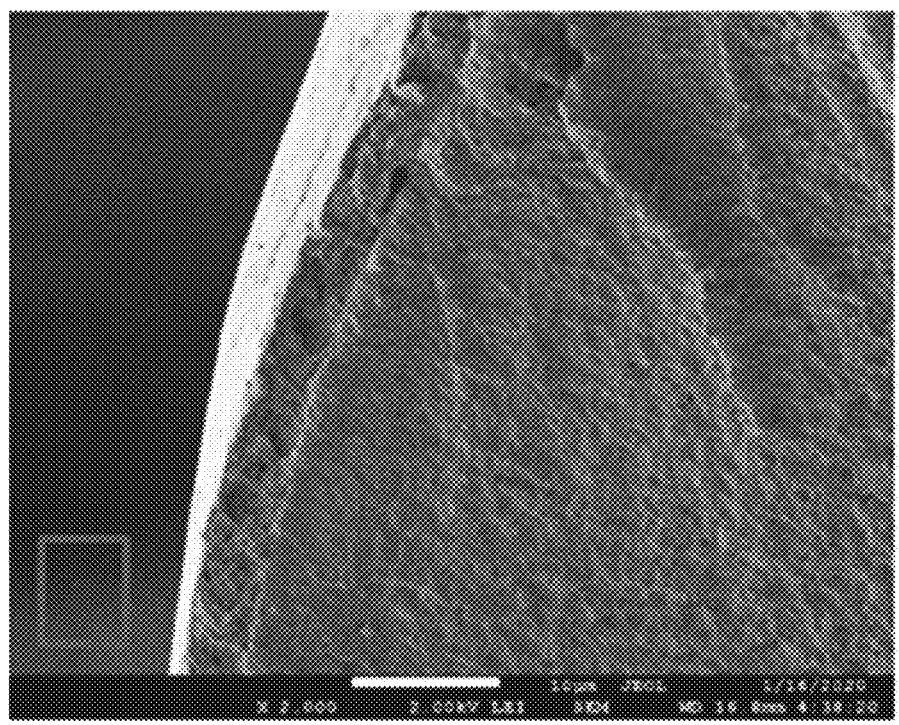
FIGS. 5A and 5B show microphotographs of a hollow fiber cross section with a porous exterior surface layer and dense non-porous interior wall, with FIG. 5A showing a SEM microphotograph of the hollow fiber cross section, and FIG. 5B showing a cross section of hollow fiber with eosin dye staining of the exterior porous layer.
Figure 5B:
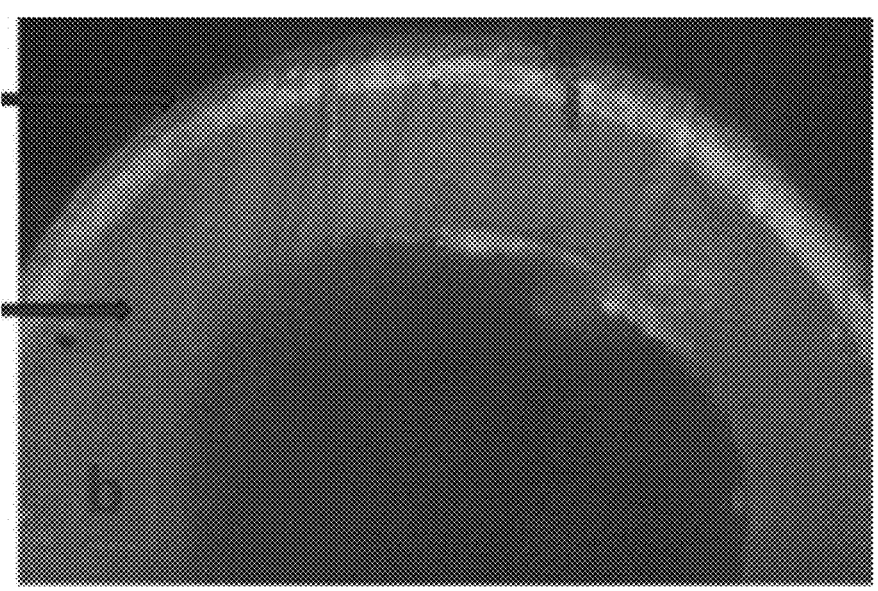

This example describes the preparation of the nanoporous composite PEEK membrane functionalized with hydroxyl groups. Poly (ether ether ketone) and polyetherimide, PEEK/PEI, blend (PEEK, Victrex 381G and PEI Ultem 1000; 50:50 by weight) was compounded in a twin extruder. A precursor hollow fiber 550 micron outside diameter and 300 micron inside diameter was prepared by melt extrusion at circa 380° C. and quenched in water. The hollow fiber was substantially amorphous. The exterior surface of the hollow fiber was washed with hexane, followed by a butanol solvent treatment at 100° C. for 20 min. The solvent treatment is directed to affect surface crystallization. The hollow fiber was then heat treated at 300° C. for 0.5 hour to affect the crystallization of the PEEK polymer in the bulk wall. The hollow fiber was immersed into NMP/monoethanolamine/water solution 80/10/10 by volume at 80° C. for 15 min. The reservoir containing the solution was blanketed with nitrogen. The hollow fiber was removed from the solution and thus formed porous surface layer of the hollow fiber was washed extensively with water followed by isopropanol and acetone. The hollow fiber was then dried at 80° C. overnight. The treatment formed a thin surface porous layer with dense hollow fiber wall interior. At this intermediate stage of membrane preparation the hollow exhibits porous exterior surface layer with dense non-porous interior. The SEM microphotograph of hollow fiber cross section and hollow fiber crossection with exterior layer stained with eosin dye are shown in FIGS. 5A and 5B, respectively. The pre-dried hollow fiber was treated with 1.0% w/v sodium borohydride solution in THF/PEG (1:1 ratio) for 4 hours while maintaining the solution at 50° C. The hollow fiber was then washed sequentially with dilute HCl solution (0.1N) and distilled water and then dried under nitrogen at 80° C. to a constant weight. The surface functionalized hollow fiber was immersed into NMP/monoethanolamine/water solution 80/10/10 by volume at 80° C. for 24 hours to complete removal of PEI phase from the hollow fiber wall interior. The reservoir containing the solution was blanketed with nitrogen. The hollow fiber was removed from the solution and washed extensively with water followed by isopropanol and acetone. The hollow fibers were then dried at 80° C. overnight. The thus prepared composite hollow fiber membrane consisted of a thin surface layer functionalized with hydroxyl groups (estimated average pore size 14 nm diameter) with the interior bulk wall porosity unaffected by the functionalization (the estimated pore size as measured BET nitrogen adsorption was 32 nm average pore diameter). The surface of the modified hollow fiber was found to be highly hydrophilic and easily wetted with water. The surface characteristics of thus formed hollow fiber were evaluated using ATR-FTIR. ATR-FTIR spectra showed a significant reduction of >C=O group concentration (residual absorption of γ C=O at 1640 cm$^{-1}$ and 1597 cm$^{-1}$) and a high concentration of —OH groups attributed to the benzhydrol moiety of thus functionalized PEEK was detected (γ O—H peak at 3400 cm$^{-1}$). The separation characteristics of the hollow fiber membrane were evaluated by conducting an ultrafiltration test utilizing polystyrene, PS, solution in ethyl acetate MW 100,000. Concentrations of PS-solutions were determined with a UV/Vis scanning spectrophotometer at a wavelength of 260 nm. The retention of PS was 99%.

Example 2

This example describes the preparation of the nanoporous composite PEEK membrane surface functionalized with hydroxyl groups. Poly (ether ether ketone) and polyetherimide, PEEK/PEI, blend (PEEK, Victrex 381G and PEI Ultem 1000; 50:50 by weight) was compounded in a twin extruder. A precursor hollow fiber 500 micron outside diameter and 300 micron inside diameter was prepared by melt extrusion at circa 380° C. and quenched in water. The hollow fiber was substantially amorphous. The exterior surface of the hollow fiber was washed with hexane, followed by acetone solvent treatment at 50° C. for 20 min. The solvent treatment is directed to affect surface crystallization. The hollow fiber was then heat treated at 310° C. for 0.5 hour to affect the crystallization of the PEEK polymer in the bulk wall. The hollow fiber was treated with 1.0% w/v sodium borohydride solution in THF/PEG (1:1 ratio) for 4 hours while maintain the solution at 80° C. The hollow fiber was then washed sequentially with dilute HCl solution (0.1N) and distilled water and then dried under nitrogen at 80° C. to a constant weight. The surface functionalized hollow fibers were immersed into NMP/monoethanolamine/water solution 80/10/10 by volume at 80° C. for 24 hours. The reservoir containing the solution was blanketed with nitrogen. Hollow fibers were removed from the solution and washed extensively with water followed by isopropanol and acetone. Hollow fibers were then dried at 80° C. overnight. The thus prepared composite hollow fiber membrane consisted of an ultra-thin surface layer functionalized with hydroxyl groups (estimated average pore size 11 nm diameter) with the interior bulk wall porosity unaffected by the functionalization (estimated average pore size 35 nm diameter). The surface of the modified hollow fiber was found to be highly hydrophilic and easily wetted with water. The surface characteristics of thus formed hollow fiber were evaluated using ATR-FTIR. ATR-FTIR spectra showed a significant reduction of >C=O group concentration (residual absorption of γ C=O at 1640 cm$^{-1}$ and 1597 cm$^{-1}$) and a high concentration of —OH groups attributed to the benzhydrol moiety of thus functionalized PEEK was detected (γ O—H peak at 3400 cm$^{-1}$). The separation characteristics of the hollow fiber membrane were evaluated by conducting an ultrafiltration test utilizing polystyrene, PS, solution in ethyl acetate MW 100,000. Concentrations of PS-solutions were determined with a UV/Vis scanning spectrophotometer at a wavelength of 260 nm. The retention of PS was 99%.

Example 3

Figure 2:
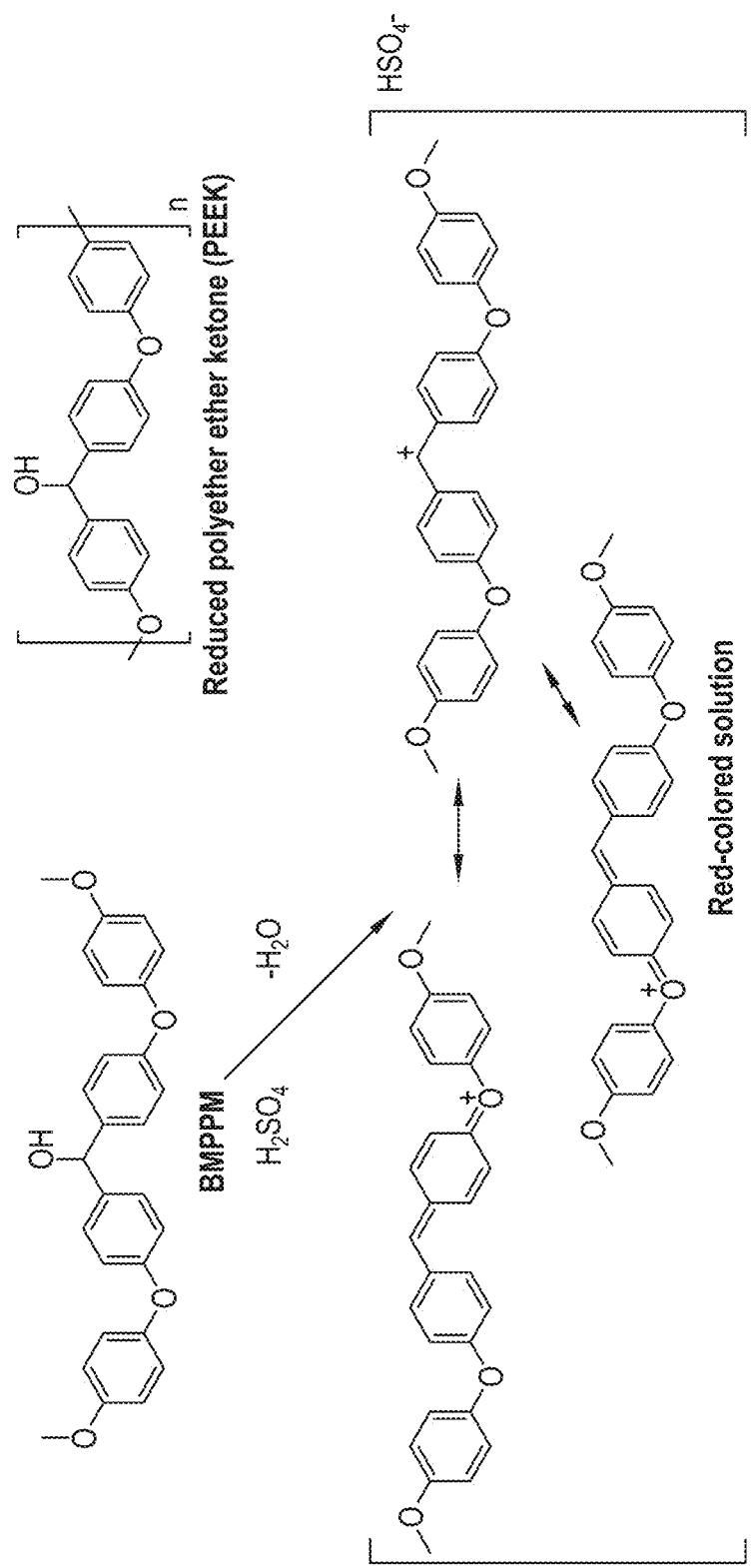
FIG. 2 illustrates red carbo-cation formation by PEEK-OH dissolved in concentrated sulfuric acid.

Composite hollow fibers were prepared as described in Example 2 except that the reaction time of ketone group reduction was varied. The concentration of hydroxyl groups as a function of the reaction time was measured by dissolving functionalized hollow fibers in concentrated sulfuric acid. The PEEK-OH forms a carbo-cation upon dissolution is sulfuric acid as shown in FIG. 2. The PEEK-OH solution in sulfuric acid as well as the solution of reference precursor PEEK hollow fiber are shown in FIGS. 3A and 3B. Absorption peak intensity at 508 nm was measured in UV-VIS spectra. An example of UV-VIS spectra are shown in FIG.

4A. The calibration curve (shown in FIG. 4B) was constructed using model compound bis(4-(4-methoxyphenoxy)phenyl) methanol, BMPPM.

The results are summarized in Table 1.

| Reaction time point (min) | Hydroxyl group concentration C(mmol/g) |
|---|---|
| T2-20 min | 4.82E−04 |
| T3-40 min | 1.68E−03 |
| T4-90 min | 4.50E−03 |
| T5-180 min | 7.43E−03 |

The degree of surface functionalization increases with increase in reaction time. Reaction conditions can be used to control the degree of functionalization. Extensive reaction times lead to an increase in the thickness of the functionalized layer.

Example 4

This example describes the preparation of the nanoporous composite PEEK membrane surface functionalized with amino groups. Poly (ether ether ketone) and polyetherimide, PEEK/PEI, blend (PEEK, Victrex 381G and PEI Ultem 1000; 50:50 by weight) was compounded in a twin extruder. A precursor hollow fiber 550 micron outside diameter and 300 micron inside diameter was prepared by melt extrusion at circa 380° C. and quenched in water. The hollow fiber was substantially amorphous. The exterior surface of the hollow fiber was washed with hexane, followed by a butanol solvent treatment at 100° C. for 20 min. The solvent treatment is directed to affect surface crystallization. The hollow fiber was then heat treated at 310° C. for 0.5 hour to affect the crystallization of the PEEK polymer in the bulk wall. The hollow fiber was immersed into NMP/monoethanolamine/water solution 80/10/10 by volume at 80° C. for 15 min. The reservoir containing the solution was blanketed with nitrogen. The hollow fiber was removed from the solution and thus formed thin porous surface layer of the hollow fiber was washed extensively with water followed by isopropanol and acetone. The hollow fiber was then dried at 80° C. overnight. The hollow fiber was placed into a reaction vessel equipped with a Dean-Stark trap and a reflux system. A solution consisting of 25 g ammonium formate, 30 ml formamide, 20 ml 88% formic acid and 100 ml nitrobenzene was placed into the reaction vessel purged with nitrogen and the temperature increased incrementally to distill the water. The temperature was raised and maintained at 165° C., for 2 hours. The solution was brought to room temperature and the hollow fiber removed. The hollow fiber rinsed sequentially with ethanol, dichloromethane and ethanol. The modified porous PEEK was deformylated by hydrolysis for 60 min with solution comprised of 12 M HCl:$C_2H_5OH$ (1:1) at temperature of 65° C. The amine hydrochloride modified hollow fibers were washed sequentially with ethanol, dichloromethane and methanol, and dried. The amine hydrochloride functionalized PEEK was evaluated by ATR-FTIR. The spectrum showed a new band in the 3000 cm$^{-1}$ region attributed to amine functional groups. The surface functionalized hollow fiber was immersed into NMP/monoethanolamine/water solution 80/10/10 by volume at 80° C. for 24 hours. The reservoir containing the solution was blanketed with nitrogen. This completed the removal of the PEI phase from the interior wall of hollow fibers. Hollow fibers were removed from the solution and washed extensively with water followed by isopropanol and acetone. Hollow fibers were then dried at 80° C. overnight. The thus prepared composite hollow fiber membrane consisted of a thin surface layer functionalized with primary amine groups (estimated average surface pore size 14 nm diameter) with the interior bulk wall porosity unaffected by the functionalization (estimated interior wall average pore size 32 nm diameter). When subjected to the Kaiser ninhydrin test, the benzhydryl amine functionalized PEEK gave a blue color after 30 sec at 25° C. The surface of the modified hollow fiber membrane was found to be highly hydrophilic and easily wetted with water. The surface characteristics of thus formed hollow fiber were evaluated using ATR-FTIR. Adsorption in the 3300-3000 cm$^{-1}$ region was attributed to the presence of —$NH_2$ groups. The separation characteristics of the hollow fiber membrane were evaluated by conducting an ultrafiltration test utilizing polystyrene, PS, solution in ethyl acetate MW 100,000. Concentrations of PS-solutions were determined with a UV/Vs scanning spectrophotometer at a wavelength of 260 nm. The retention of PS was 96%.

Example 5

This example describes preparation of a composite PEEK membrane with a separation layer modified towards a lower molecular weight cut off. The composite hollow fiber membrane prepared as described in Example 1 was reacted with the epoxy-functional polyethylene oxide oligomer, poly (ethylene glycol) diglycidyl ether MW 6000, to modify the surface pore size of the membrane. The polyethylene oxide groups are known to impart anti-fouling characteristics. The hollow fiber was contacted with 5% solution of diglycidyl ether in THF at reflux conditions for 4 hours. The solution further contained 0.1% of N,N,N',N'-tetramethyl-1,6-hexanediamine, TMHD, catalyst. The separation characteristics of the hollow fiber membrane were evaluated by conducting an ultrafiltration test utilizing polystyrene, PS, solution in ethyl acetate MW 13,000. Concentrations of PS-solutions were determined with a UV/Vs scanning spectrophotometer at a wavelength of 260 nm. The retention of PS was 97%.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A method of forming a composite fluid separation membrane, said method comprising the steps of:
   (a) forming a blend of a poly(aryl ether ketone) polymer with a polyimide;
   (b) forming a shaped article from the blend by melt processing, wherein the article is substantially amorphous;
   (c) subjecting a surface of the article to a solvent treatment step that induces crystallization in the article to a predetermined depth;
   (d) subjecting the article, subsequent to step (c), to a second crystallization step to complete crystallization;
   (e) introducing functional groups on the surface of the article;
   (f) bringing the article into contact with a solution of primary amine or hydrazine to affect decomposition of the polyimide; and
   (g) removing products of polyimide decomposition from the article.

2. A system for separating a fluid mixture into a fraction enriched in at least one component and a fraction depleted in the at least one component, said system comprising:
- an asymmetric surface functionalized poly (aryl ether ketone) fluid separation membrane formed according to the method of claim 1; and
- a source of pressure for maintaining a pressure difference, or in case of a vapor component a partial pressure difference, across the fluid separation membrane,
- whereby the fraction enriched in the at least one component and the fraction depleted in the at least one component are generated by preferentially permeating a portion of the fluid mixture through the fluid separation membrane.

3. The system of claim 2 wherein the fluid mixture is an organic solvent-based fluid mixture.

4. A method of forming a composite poly (aryl ether ketone) membrane, said method comprising the steps of:
- (a) forming a blend of a poly(aryl ether ketone) polymer with a polyimide;
- (b) forming a shaped article from the blend by melt processing, wherein the article is substantially amorphous;
- (c) subjecting a surface of the article to a solvent treatment step that induces crystallization in the article to predetermined depth;
- (d) subjecting the article, subsequent to step (c), to a thermal annealing step to complete crystallization;
- (e) removing the polyimide from the surface of the article to a predetermined depth to form a mesoporous layer;
- (f) introducing functional groups on a surface of the mesoporous layer via reaction with benzophenone segments of a polymeric backbone of the polymer;
- (g) bringing the article into contact with a primary amine or hydrazine to affect decomposition of the polyimide;
- (h) removing products of polyimide decomposition from the article; and
- (i) recovering the composite membrane, wherein only the surface of the mesoporous layer is functionalized.

5. The method of claim 1 wherein the functional groups on the surface of the article are introduced via reaction with benzophenone segments of a polymeric backbone of the poly(aryl ether ketone) polymer.

6. The method of claim 1 wherein following step (e) or step (g) the functional groups on the surface of the article are reacted with functional organic molecules to form a separation layer covalently attached to the surface of the article via the functional groups.

7. The method of claim 1 wherein the crystallization in step (c) is carried out in an alcohol, a ketone, a chlorinated hydrocarbon, polyethylene glycol, an aromatic hydrocarbon or a mixture thereof.

8. The method of claim 7 wherein the ketone is an acetone, a methyl ethyl ketone, a 2-hexanone, an isophorone, a methyl isobutyl ketone, a cyclopentanone, an acetophenone, a valerophenone, a pentanone or a mixture thereof or a mixture with water.

9. The method of claim 1 wherein the crystallization to the predefined depth in step (c) defines a surface layer that is mesoporous.

10. The method of claim 9 wherein a thickness of the mesoporous surface layer is less than 1 micron.

11. The membrane of claim 9 wherein the functional groups are further reacted with functional organic molecules to form a separation layer covalently attached to the mesoporous surface layer of the membrane.

12. The method of claim 11 wherein the separation layer has a concentration of functional groups of at least $1 \times 10^{-5}$ µmol/cm$^2$.

13. The method of claim 12 wherein the separation layer has a concentration of functional groups of at least $5 \times 10^{-5}$ µmol/cm$^2$.

14. The method of claim 1 wherein the functional groups are selected from: primary, secondary, tertiary or quaternary amine groups, a carboxyl group, a sulfonic acid group, a phosphate group, primary, secondary or tertiary hydroxyl groups, an ethylene oxide group and/or a sulfhydryl group.

15. The method of claim 1 wherein the fluid separation membrane is in the shape of a film, a frit, a hollow fiber or a monolith.

16. The method of claim 1 wherein the fluid separation membrane is an ultrafiltration, nanofiltration or reverse osmosis membrane.

17. The method of claim 1 wherein the poly (aryl ether ketone) comprises a poly (ether ketone), a poly (ether ether ketone), a poly (ether ketone ketone), a poly (ether ether ketone ketone) or a poly (ether ketone ether ketone ketone).

18. The method of claim 1 wherein the polyimide is a mixture of polyimides or a mixture of a polyimide with an additional pore-forming material.

19. The method of claim 1 wherein the polyimide is a poly (ether imide).

20. The method of claim 1 wherein a concentration of the functional groups is at least $1 \times 10^{-5}$ µmol/cm$^2$.

21. The method of claim 20 wherein the concentration of functional groups is at least $5 \times 10^{-5}$ µmol/cm$^2$.

22. The method of claim 1 wherein the article is mesoporous with a surface layer exhibiting an average pore diameter smaller by at least factor of two than an average pore diameter of an interior of the article.

23. The method of claim 22 wherein the average pore diameter of the surface layer is less than 70 nm.

24. The method of claim 23 wherein the average pore diameter of the surface layer falls within the range of 5 nm to 20 nm.

25. The method of claim 1 wherein the fluid separation membrane has a pore volume between 40 and 80%.

26. The method of claim 1 wherein the fluid separation membrane exhibits a degree of crystallinity of at least 20%.

27. The method of claim 1 wherein the crystallization in step (d) is carried out by a thermal treatment at a temperature between 210° C. and 310° C.

28. The method of claim 5 wherein the functional groups are formed by reduction of ketone groups in a benzophenone segment of the polymeric backbone to hydroxyl groups.

29. The method of claim 28 wherein the ketone group reduction is carried out utilizing sodium borohydride solution in an alcohol/water solvent mixture, or an alcohol/polyethylene glycol solvent mixture or a tetrahydrofuran/polyethylene glycol solvent mixture.

30. The method of claim 28 wherein the hydroxyl groups are further reacted with functional epoxide molecules.

* * * * *